US012590910B2

(12) United States Patent
Miyazaki et al.

(10) Patent No.: US 12,590,910 B2
(45) Date of Patent: Mar. 31, 2026

(54) X-RAY INSPECTION APPARATUS AND X-RAY INSPECTION SYSTEM

(71) Applicant: ANRITSU CORPORATION, Kanagawa (JP)

(72) Inventors: Itaru Miyazaki, Kanagawa (JP); Eiji Tsujimura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 257 days.

(21) Appl. No.: 18/605,269

(22) Filed: Mar. 14, 2024

(65) Prior Publication Data

US 2024/0328964 A1      Oct. 3, 2024

(30) Foreign Application Priority Data

Mar. 31, 2023      (JP) ................................ 2023-058559
Nov. 9, 2023      (JP) ................................ 2023-191475

(51) Int. Cl.
*G01N 23/04*          (2018.01)
*G01N 23/083*         (2018.01)

(52) U.S. Cl.
CPC ........... *G01N 23/04* (2013.01); *G01N 23/083* (2013.01); *G01N 2223/643* (2013.01)

(58) Field of Classification Search
CPC . G01N 23/04; G01N 23/083; G01N 2223/643
See application file for complete search history.

(56) References Cited

U.S. PATENT DOCUMENTS

| | | | | |
|---|---|---|---|---|
| 2024/0328967 A1* | 10/2024 | Miyazaki | ............. | G01N 23/083 |
| 2025/0224348 A1* | 7/2025 | Murai | .................. | G01B 15/025 |
| 2025/0297971 A1* | 9/2025 | Damiano | ......... | G06Q 10/06395 |

FOREIGN PATENT DOCUMENTS

| | | | | | |
|---|---|---|---|---|---|
| CN | 219129996 U | * | 6/2023 | | |
| DE | 102021206401 A1 | * | 12/2022 | ........... | G01N 23/046 |
| JP | S61-112948 A | | 5/1986 | | |
| JP | S62-232547 A | | 10/1987 | | |
| JP | 2000221144 A | * | 8/2000 | | |
| JP | 2009-080088 A | | 4/2009 | | |
| JP | 2010-066241 A | | 3/2010 | | |
| JP | 7060446 B2 | | 4/2022 | | |
| JP | 2022-179006 A | | 12/2022 | | |
| WO | 2022/239759 A1 | | 11/2022 | | |

* cited by examiner

*Primary Examiner* — Casey Bryant
(74) *Attorney, Agent, or Firm* — McDonald Hopkins LLC

(57) ABSTRACT

To provide an X-ray inspection apparatus capable of obtaining a clear transmission image with less noise without reducing a conveyance speed of an inspection object. There is provided an X-ray inspection apparatus in which an X-ray generator and an X-ray detector are disposed to face each other with a conveyance path interposed between the X-ray generator and the X-ray detector, conveyance path through which inspection objects that are sequentially conveyed pass. The X-ray generator and the X-ray detector are configured to move back and forth in a conveyance direction of the inspection object and an opposite direction thereof. The X-ray detector captures an image of the inspection object while the X-ray generator and the X-ray detector moves in the conveyance direction from an image capturing start position to an image capturing end position at a speed equal to the conveyance speed of the inspection object.

17 Claims, 11 Drawing Sheets

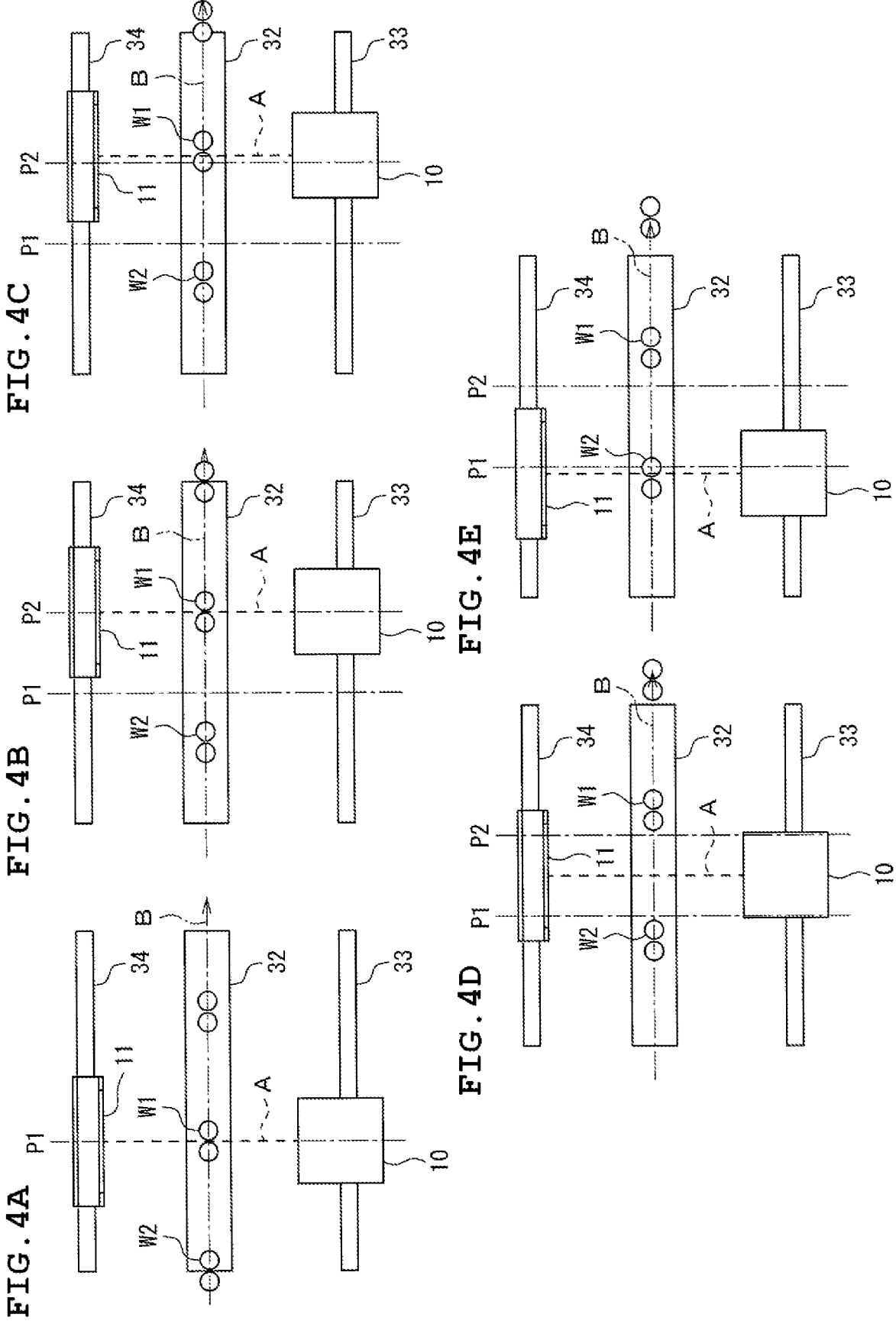

X-RAY INSPECTION APPARATUS AND X-RAY INSPECTION SYSTEM

TECHNICAL FIELD

The present invention relates to an X-ray inspection apparatus and an X-ray inspection system.

BACKGROUND ART

Patent Document 1 discloses an X-ray foreign matter inspection apparatus including an X-ray generator that is disposed at a predetermined height apart above an inspection space in the middle of a conveyance path and irradiates inspection objects that are sequentially conveyed with X-rays in the inspection space, and an X-ray line sensor that is disposed in a conveyance section to face the X-ray generator and detects X-rays that have been transmitted through the inspection object.

RELATED ART DOCUMENT

Patent Document

[Patent Document 1] Japanese Patent No. 7060446

DISCLOSURE OF THE INVENTION

Problem that the Invention is to Solve

However, in the X-ray foreign matter inspection apparatus disclosed in Patent Document 1, if the exposure time for the inspection object is short, the obtained transmission image becomes an image with a lot of noise. Furthermore, for example, in a case where a relatively thick inspection object is to be inspected, if the exposure time is short, the obtained transmission image becomes an unclear image. Therefore, if the exposure time for the inspection object is short, it is not possible to improve inspection accuracy.

On the other hand, if the exposure time is set to be long, it is possible to obtain a clear transmission image with less noise, but as the exposure time becomes longer, it is necessary to reduce the conveyance speed of the inspection object or to temporarily stop the conveyance in some cases. Thus, it is not possible to perform efficient inspection.

The present invention has been made in view of the above-described circumstances, and an object of the present invention is to provide an X-ray inspection apparatus and an X-ray inspection system capable of obtaining a clear transmission image with less noise without reducing a conveyance speed of an inspection object.

Means for Solving the Problem

According to a first aspect of the present invention, an X-ray inspection apparatus includes an X-ray generator that irradiates inspection objects that are sequentially conveyed with X-rays, an X-ray detector that detects the X-rays that have been transmitted through the inspection object, and a conveyance path through which the inspection object passes, in which the X-ray generator and the X-ray detector are disposed to face each other with the conveyance path interposed between the X-ray generator and the X-ray detector. The X-ray generator and the X-ray detector are configured to move back and forth in a conveyance direction of the inspection object and an opposite direction. The X-ray generator and the X-ray detector are configured to capture an image of the inspection object while performing a following movement in the conveyance direction from an image capturing start position to an image capturing end position at a speed equal to a conveyance speed of the inspection object.

With this configuration, in the X-ray inspection apparatus according to the present invention, the X-ray generator and the X-ray detector are configured to be movable back and forth in a direction parallel to the conveyance direction of the inspection object, and capture an image of the inspection object while moving in the conveyance direction from the image capturing start position to the image capturing end position at the speed equal to the conveyance speed of the inspection object. Thus, it is possible to lengthen an exposure time without reducing the conveyance speed of the inspection object as compared to a configuration in which the X-ray generator and X-ray detector are fixed and perform image capturing. Therefore, in the X-ray inspection apparatus according to the present invention, it is possible to obtain a clear transmission image with less noise without reducing the conveyance speed of the inspection object.

According to a second aspect of the present invention, in the X-ray inspection apparatus in the first aspect, the X-ray generator and the X-ray detector are configured to perform the following movement to the image capturing end position, and then perform a return movement of returning to the image capturing start position before an inspection object to be conveyed next reaches the image capturing start position.

With this configuration, in the X-ray inspection apparatus according to the present invention, the X-ray generator and the X-ray detector move to the image capturing end position, and then return to the image capturing start position before the inspection object to be conveyed next reaches the image capturing start position. Thus, it is possible to bring the X-ray generator and X-ray detector back to the image capturing start position provided for image capturing of the next inspection object, by using a gap time between inspection objects that are sequentially conveyed.

According to a third aspect of the present invention, in the X-ray inspection apparatus in the second aspect, a movement speed of the return movement in which the X-ray generator and the X-ray detector return to the image capturing start position is faster than the conveyance speed.

With this configuration, in the X-ray inspection apparatus according to the present invention, the movement speed at which the X-ray generator and the X-ray detector return to the image capturing start position is faster than the conveyance speed. Thus, it is possible to reduce an interval between the inspection objects that are sequentially conveyed, and it is possible to increase the number of inspections per unit time.

According to a fourth aspect of the present invention, the X-ray inspection apparatus in the second aspect further includes a reference image information storage unit that stores reference image information that is image information of a reference image obtained by capturing an image of the inspection object in advance, a determination unit that determines whether or not image information of an X-ray image obtained by the image capturing coincides with the reference image information, and a control unit that adjusts an irradiation range of the X-rays and a movement speed of the X-ray detector in a case where the determination unit determines that the image information of the X-ray image obtained by the image capturing does not coincide with the reference image information.

In addition, according to a fifth aspect of the present invention, the X-ray inspection apparatus in the third aspect further includes a reference image information storage unit that stores reference image information that is image information of a reference image obtained by capturing an image of the inspection object in advance, a determination unit that determines whether or not image information of an X-ray image obtained by the image capturing coincides with the reference image information, and a control unit that adjusts an irradiation range of the X-rays and a movement speed of the X-ray detector in a case where the determination unit determines that the image information of the X-ray image obtained by the image capturing does not coincide with the reference image information.

Since the control unit that adjusts the irradiation range of the X-rays and the movement speed of the X-ray detector in a case where the determination unit determines that the image information of the X-ray image obtained by the image capturing does not coincide with the reference image information is provided, it is possible to improve quality of the X-ray image by adjusting the irradiation range of the X-rays and the movement speed of the X-ray detector even in a case where, for example, an inspection object in the X-ray image becomes unclear due to an occurrence of deviation between the movement of the inspection object, and the irradiation range of the X-rays and the following movement of the X-ray detector, or the position of the inspection object in the X-ray image is shifted from the position of a workpiece image in the reference image, whereby the quality of the X-ray image deteriorates.

According to a sixth aspect of the present invention, in the X-ray inspection apparatus in the fourth aspect, the determination unit performs determination to be a first pattern in which the image information of the X-ray image obtained by the image capturing does not coincide with the reference image information, in a case where a contrast of the inspection object in the X-ray image obtained by the image capturing is different from a contrast of the inspection object in the reference image, and the control unit adjusts a movement speed of the following movement in a case of the first pattern.

In addition, according to a seventh aspect of the present invention, in the X-ray inspection apparatus in the fifth aspect, the determination unit performs determination to be a first pattern in which the image information of the X-ray image obtained by the image capturing does not coincide with the reference image information, in a case where a contrast of the inspection object in the X-ray image obtained by the image capturing is different from a contrast of the inspection object in the reference image, and the control unit adjusts a movement speed of the following movement in a case of the first pattern.

With this configuration, the X-ray inspection apparatus according to the present invention performs determination to be the first pattern in which the image information of the X-ray image obtained by image capturing does not coincide with the reference image information, in a case where the contrast of the inspection object in the X-ray image obtained by the image capturing is different from the contrast of the inspection object in the reference image, and adjusts the movement speed of the following movement in this case. Thus, it is possible to cause the irradiation range of the X-rays and the movement speed of the X-ray detector during the following movement to coincide with the conveyance speed of the inspection object. As a result, it is possible to cause the contrast of the inspection object in the X-ray image obtained by image capturing to coincide with the contrast of the inspection object in the reference image, and it is possible to improve the quality of the X-ray image.

According to an eighth aspect of the present invention, in the X-ray inspection apparatus in the fourth aspect, the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit adjusts a movement speed of the return movement in a case of the second pattern.

In addition, according to a ninth aspect of the present invention, in the X-ray inspection apparatus in the fifth aspect, the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit adjusts a movement speed of the return movement in a case of the second pattern.

With this configuration, the X-ray inspection apparatus according to the present invention performs determination to be the second pattern in which the image information of the X-ray image obtained by image capturing does not coincide with the reference image information, in a case where the position of the inspection object in the X-ray image obtained by the image capturing is different from the position of the inspection object in the reference image, and adjusts the movement speed of the return movement in this case. Thus, it is possible to adjust the irradiation range of the X-rays and a timing at which the X-ray detector returns to a position at which the X-ray detector is able to capture an image of the inspection object located at the image capturing start position. Thus, it is possible to cause a timing at which the inspection object reaches the image capturing start position to coincide with a timing at which the X-ray generator and the X-ray detector start image capturing. As a result, it is possible to cause the position of the inspection object in the X-ray image obtained by image capturing to coincide with the position of the inspection object in the reference image, and it is possible to improve the quality of the X-ray image.

According to a tenth aspect of the present invention, in the X-ray inspection apparatus in the fourth aspect, the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit transmits, to an outside, a notification that the image information of the X-ray image obtained by the image capturing does not coincide with the reference image information, in a case of the second pattern.

In addition, according to an eleventh aspect of the present invention, in the X-ray inspection apparatus in the fifth aspect, the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit transmits, to an outside, a notification that the image information of the X-ray image obtained by the image capturing does not coincide with the reference image information, in a case of the second pattern.

With this configuration, the X-ray inspection apparatus according to the present invention performs determination to be the second pattern in which the image information of the X-ray image obtained by the image capturing does not coincide with the reference image information, in a case where the position of the inspection object in the X-ray image obtained by the image capturing is different from the position of the inspection object in the reference image, and transmits, to an outside, a notification that the image information of the X-ray image obtained by the image capturing does not coincide with the reference image information, in this case. Thus, it is possible to inform a user that the quality of the X-ray image needs to be improved. In response to the above-described notification, the user can change settings of a conveyance device that conveys an inspection object to the X-ray inspection apparatus or a loading device that loads an inspection object into the conveyance device, for example.

According to a twelfth aspect of the present invention, in the X-ray inspection apparatus in the fourth aspect, the X-ray generator and the X-ray detector are configured to perform image capturing even during the return movement, the determination unit determines whether or not there is an inspection object in an X-ray image captured during the return movement, and the control unit transmits, to an outside, a notification that conveyance of an inspection object is abnormal, in a case where the determination unit determines that there is the inspection object in the X-ray image captured during the return movement.

In addition, according to a thirteenth aspect of the present invention, in the X-ray inspection apparatus in the fifth aspect, the X-ray generator and the X-ray detector are configured to perform image capturing even during the return movement, the determination unit determines whether or not there is an inspection object in an X-ray image captured during the return movement, and the control unit transmits, to an outside, a notification that conveyance of an inspection object is abnormal, in a case where the determination unit determines that there is the inspection object in the X-ray image captured during the return movement.

With this configuration, the X-ray inspection apparatus according to the present invention transmits, to the outside, the notification that the conveyance of the inspection object is abnormal, in a case where it is determined that there is the inspection object in the X-ray image captured during the return movement. Thus, it is possible to inform the user that there is a probability that a conveyance interval of inspection objects is reduced or the conveyance speed is increased to an extent that it is not possible to respond to the conveyance interval of the inspection objects and the conveyance speed by adjusting the irradiation range of the X-rays and the movement speed of the X-ray detector. In response to the above-described notification, the user can change settings of a conveyance device that conveys an inspection object to the X-ray inspection apparatus or a loading device that loads an inspection object into the conveyance device, for example.

According to a fourteenth aspect of the present invention, in the X-ray inspection apparatus in the second aspect, the X-ray generator and the X-ray detector are unitized to be integrally movable back and forth in the conveyance direction and the opposite direction.

In addition, according to a fifteenth aspect of the present invention, in the X-ray inspection apparatus in the fourth aspect, the X-ray generator and the X-ray detector are unitized to be integrally movable back and forth in the conveyance direction and the opposite direction.

With this configuration, in the X-ray inspection apparatus according to the present invention, the X-ray generator and the X-ray detector are unitized to be integrally movable back and forth in the direction parallel to the conveyance direction. Thus, it is possible to move the X-ray generator and the X-ray detector at the same speed without shift.

According to a sixteenth aspect of the present invention, in the X-ray inspection apparatus in the first aspect, the X-ray detector is configured by an area sensor.

With this configuration, in the X-ray inspection apparatus according to the present invention, since the X-ray detector is configured by the area sensor, it is possible to obtain a still image without stopping the conveyance of the inspection object.

According to a seventeenth aspect of the present invention, an X-ray inspection system includes the X-ray inspection apparatus in the fourth aspect, a conveyance device that conveys an inspection object to the X-ray inspection apparatus, and a loading device that loads the inspection object into the conveyance device.

The determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit outputs a signal to the loading device to adjust a loading timing of the inspection object into the conveyance device, in the case of the second pattern.

With this configuration, the X-ray inspection system according to the present invention performs determination to be the second pattern in which the image information of the X-ray image obtained by the image capturing does not coincide with the reference image information, in a case where the position of the inspection object in the X-ray image obtained by the image capturing is different from the position of the inspection object in the reference image, and outputs a signal to the loading device to adjust a loading timing of the inspection object into the conveyance device. Thus, it is possible to adjust the loading timing of the inspection object in the loading device. Thus, it is possible to cause a timing at which the inspection object reaches the image capturing start position to coincide with a timing at which the X-ray generator and the X-ray detector start image capturing. As a result, it is possible to cause the position of the inspection object in the X-ray image obtained by image capturing to coincide with the position of the inspection object in the reference image, and it is possible to improve the quality of the X-ray image.

Advantage of the Invention

According to the present invention, it is possible to provide an X-ray inspection apparatus and an X-ray inspection system capable of obtaining a clear transmission image with less noise without reducing the conveyance speed of an inspection object.

BRIEF DESCRIPTION OF THE DRAWINGS

FIGS. 4A to 4E are diagrams illustrating, in chronological order, a positional relationship between the image capturing unit of the X-ray inspection apparatus and a workpiece, according to the embodiment of the present invention.

FIGS. 5A and 5B are diagrams illustrating a workpiece image in an X-ray image captured by the image capturing unit in the X-ray inspection apparatus according to the embodiment of the present invention, in which FIG. 5A illustrates a case where the workpiece image is blurred; and FIG. 5B illustrates a case where a position of the workpiece image in the X-ray image is shifted from a position of the workpiece image in the reference image.

BEST MODE FOR CARRYING OUT THE
INVENTION

Figure 1:
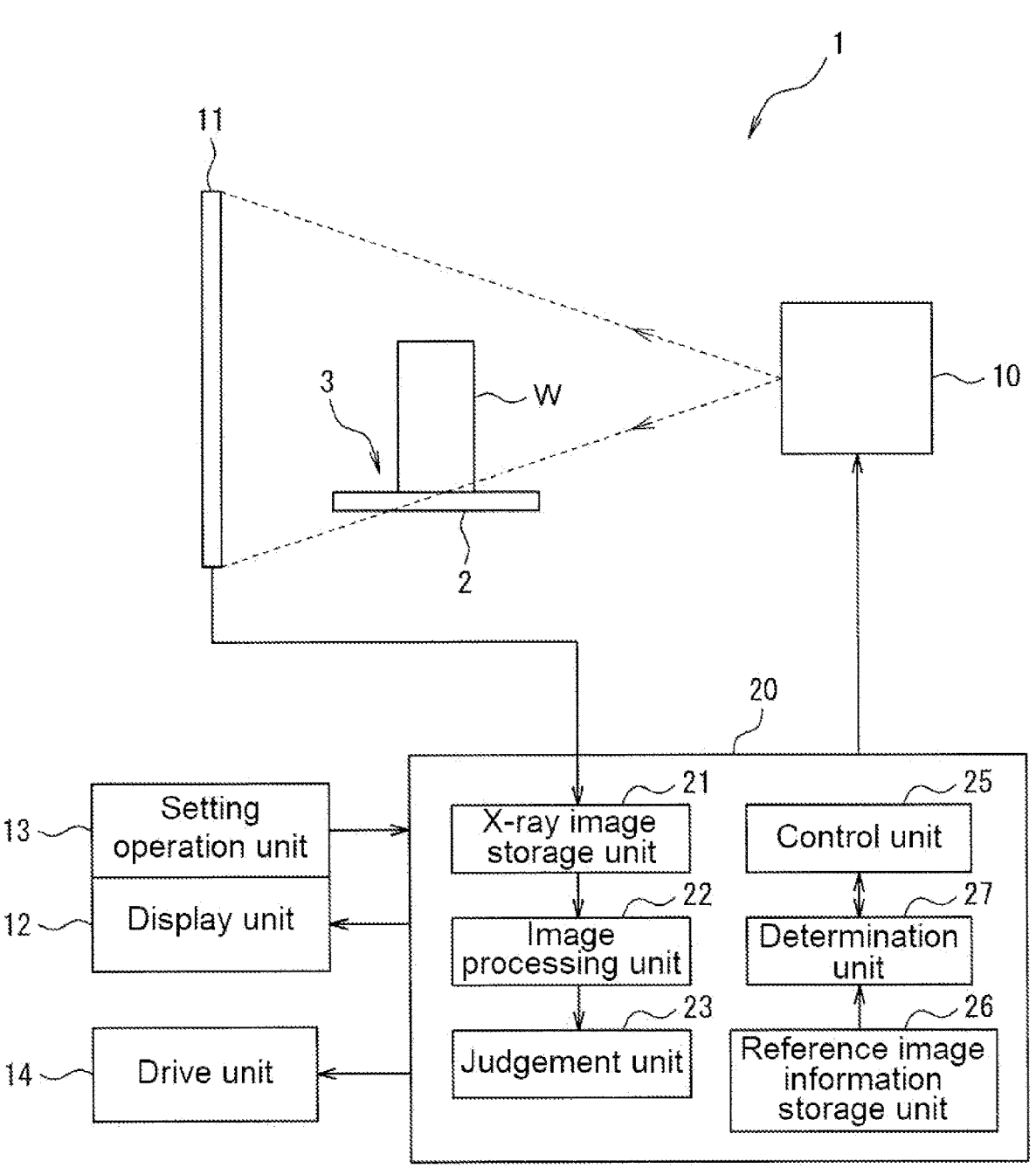
FIG. 1 is a schematic diagram illustrating a configuration of an X-ray inspection apparatus according to an embodiment of the present invention.

Hereinafter, an X-ray inspection apparatus according to an embodiment of the present invention will be described with reference to the drawings.
Configuration of X-ray Inspection Apparatus As illustrated in FIG. 1, an X-ray inspection apparatus 1 in the present embodiment is an X-ray inspection apparatus that irradiates a workpiece W as an inspection object to be conveyed with X-rays and inspects contained foreign matters in the workpiece W, a shape thereof, and the like by using a transmission image obtained by detecting the transmitted X-rays.

In the present embodiment, an example in which a cylindrical article such as a bottle product is used as the workpiece W will be described, but the workpiece W is not limited to this.

The X-ray inspection apparatus 1 in the present embodiment includes a housing (not illustrated), an X-ray generator 10 that generates X-rays, an X-ray detector 11 that detects X-rays that have been transmitted through a workpiece W, and a control circuit 20. The X-ray generator 10, the X-ray detector 11, and the control circuit 20 are accommodated in the housing (not illustrated).

The housing is incorporated into a conveyor 2 that conveys a workpiece W. The conveyor 2 is a part of a production facility for a workpiece W, and is configured separately from the X-ray inspection apparatus 1. As described above, the X-ray inspection apparatus 1 is an incorporated type X-ray inspection apparatus that is incorporated into the separate conveyor 2, and may be incorporated into an existing conveyor, such as a top chain conveyor or a belt conveyor, which conveys the workpiece W in the horizontal direction.

The X-ray generator 10 and the X-ray detector 11 are disposed to face each other in the width direction of the conveyor 2 with a conveyance path 3 interposed between the X-ray generator 10 and the X-ray detector 11. The workpiece W on the conveyor 2 passes through the conveyance path 3.

The X-ray generator 10 generates X-rays by irradiating a target of an anode with an electron beam from a cathode of an X-ray tube (not illustrated) provided inside the X-ray generator, and radially performs irradiation with the generated X-rays such that an image of a range indicated by the broken line in FIG. 1 is captured. Thus, the X-ray generator 10 irradiates the workpiece W on the conveyor 2, which is sequentially conveyed, with X-rays.

The X-ray detector 11 includes a photodiode (not illustrated) and a plurality of X-ray detection elements (not illustrated) each including a scintillator provided on the photodiode. The X-ray detector 11 is configured by an area sensor in which X-ray detection elements are arranged in a planar shape in a conveyance direction and a direction perpendicular to the conveyance direction.

The X-ray detector 11 captures a transmission image (referred to as an "X-ray image" below) of the X-rays with which a workpiece W on the conveyance path 3 is irradiated from the X-ray generator 10 and then through which the workpiece W has been transmitted. Specifically, the scintillator of the X-ray detection element converts the X-rays into an optical signal, and the optical signal is converted into an electrical signal by the photodiode. Further, a process such as noise removal is executed to generate an X-ray image with a density distribution based on the amount of X-ray transmission.

A display unit 12, a setting operation unit 13, and a drive unit 14 are connected to the control circuit 20.

The display unit 12 is configured by a flat display or the like, and performs display and output to the user. The display unit 12 displays images of inspection results, determination results, and the like by the control circuit 20.

In addition, the display unit 12 displays a quality judgement result of the workpiece W by using characters or symbols such as "OK" and "NG". In addition, the display unit 12 displays statistical values such as the total number of inspections, the number of non-defective products, and the total number of NG products. Further, the display unit 12 displays, for example, a message indicating that conveyance of the workpiece W is abnormal, by using characters or symbols, based on a determination result in addition to the determination result by the determination unit 27 which will be described later.

The display content and the display mode of the display unit 12 are determined based on default settings or a request from the setting operation unit 13 by operating a predetermined key.

The setting operation unit 13 is used to input settings of various parameters and the like to the control circuit 20. The setting operation unit 13 is configured by a plurality of keys, switches, and the like operated by the user, and is used to input settings of various parameters and the like to the control circuit 20 and select an operation mode.

In the present embodiment, the display unit 12 and the setting operation unit 13 are integrated as a touch panel type display device, and are disposed at the front surface upper portion of the housing (not illustrated).

The drive unit 14 is configured as a drive source that moves an image capturing unit 30, which will be described later, back and forth in a direction parallel to the conveyance direction of the workpiece W, and is configured by an actuator such as a motor, for example.

The control circuit 20 includes an X-ray image storage unit 21, an image processing unit 22, a judgement unit 23, a control unit 25, a reference image information storage unit 26, and a determination unit 27.

The X-ray image storage unit 21 stores an X-ray image received from the X-ray detector 11.

The image processing unit 22 performs image processing on the X-ray image read from the X-ray image storage unit 21 by applying various image processing algorithms and the like. Here, the image processing algorithm is configured by a combination of multiple image processing filters.

The judgement unit 23 judges whether or not a foreign matter is contained by distinguishing between the workpiece W and the foreign matter from the X-ray image processed by the image processing unit 22. In addition, the judgement unit 23 judges whether or not the shape of the workpiece W is favorable.

The control unit 25 includes a CPU, a memory as a storage area or a work area for control programs, and the like, and controls the entirety of the X-ray inspection apparatus 1. The control content of the control unit 25 includes controls of the display content and a display form of the display unit 12.

Further, the control unit 25 controls the driving of the drive unit 14. The control unit 25 controls driving of the drive unit 14 to control a reciprocating movement operation of the image capturing unit 30 or to adjust a movement speed of the image capturing unit 30.

The reference image information storage unit 26 stores image information (referred to as "reference image information" below) of an X-ray image (referred to as a "reference image" below) obtained by capturing an image of a sample of the workpiece W in advance. As the reference image, for example, a still image of a sample of the workpiece W may be used, or an X-ray image obtained by capturing an image of a sample of the workpiece W while following the sample of the workpiece W after the movement speed of the image capturing unit 30, the conveyance speed of the workpiece W, the conveyance interval of the workpiece W, and the like are adjusted may be used.

The reference image information includes various types of information that can be specified as the reference image, such as contrast information of the workpiece W in the reference image and center coordinates of the workpiece W in the reference image.

The determination unit 27 determines whether or not image information of the X-ray image obtained by capturing an image of the workpiece W while following the workpiece W coincides with the reference image information. Here, the phrase of "coinciding with the reference image information" means not only a case of completely coinciding with the reference image information, but also, for example, a case where differences between various numerical values indicating the image information of the captured X-ray image and various numerical values indicating the reference image information fall within an allowable range.

Image Capturing Unit

Figure 2:
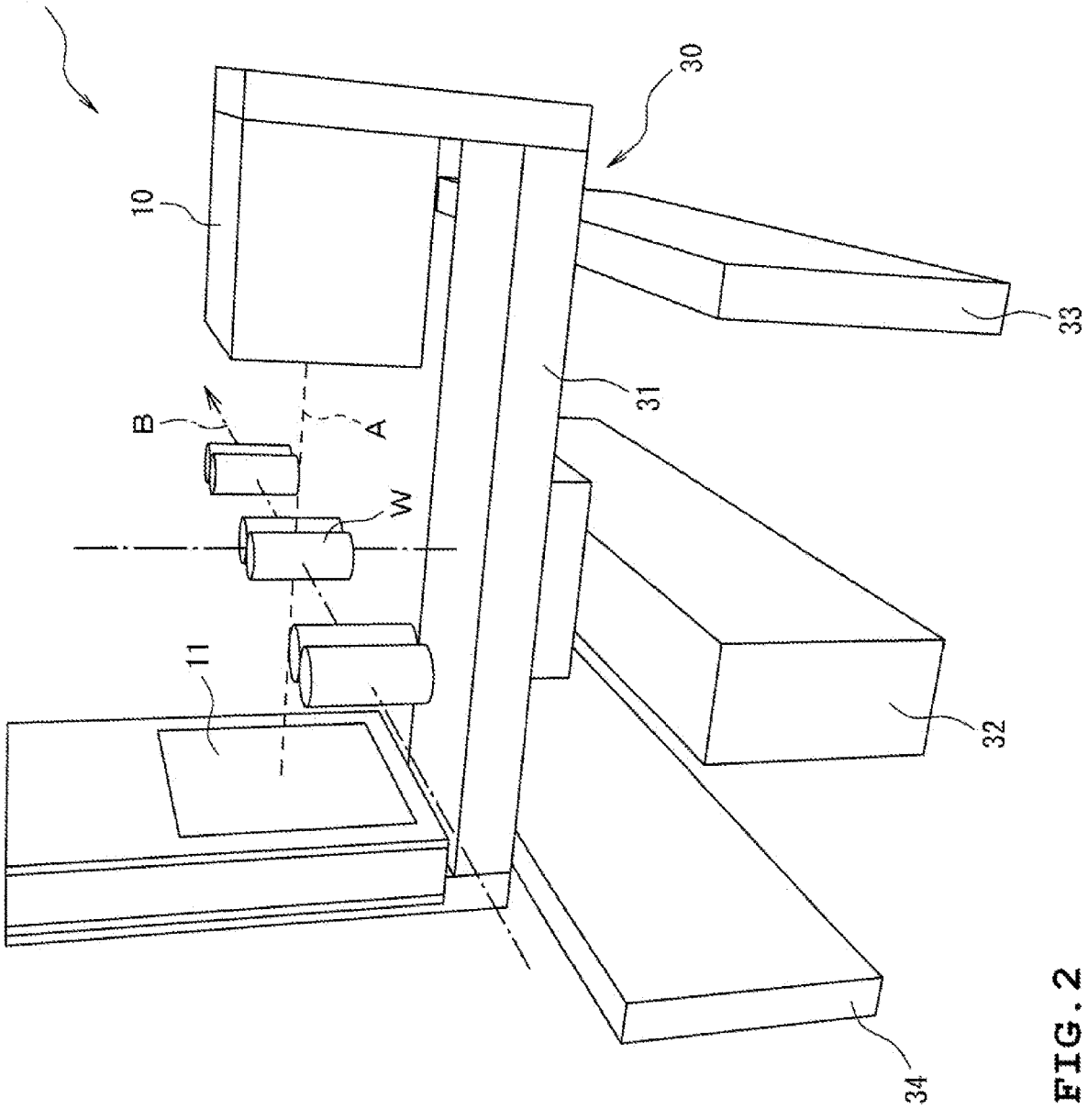
FIG. 2 is a schematic perspective view illustrating the X-ray inspection apparatus according to the embodiment of the present invention.

As illustrated in FIG. 2, in the X-ray inspection apparatus 1 in the present embodiment, the X-ray generator 10 and the X-ray detector 11 are joined to each other by a moving bracket 31, so that the X-ray generator 10 and the X-ray detector 11 are unitized to be able to move back and forth in a direction parallel to a conveyance direction B of the workpiece W (in other words, in the conveyance direction B of the workpiece W and the opposite direction thereof).

In the present embodiment, the X-ray generator 10, the X-ray detector 11, and the moving bracket 31 constitute the image capturing unit 30.

The moving bracket 31 is configured to move back and forth on a linear slider 32 that extends in a direction parallel to the conveyance direction B of the workpiece W. The back-and-forth movement of the moving bracket 31 is realized by driving the drive unit 14.

A pair of guide rails 33 and 34 are provided at the lower portion of the moving bracket 31. The guide rails 33 and 34 are disposed to face each other in a direction perpendicular to the conveyance direction B with the linear slider 32 interposed between the guide rails 33 and 34. The moving bracket 31 moves back and forth while being guided by the pair of guide rails 33 and 34.

As a result, the X-ray generator 10 and the X-ray detector 11 move back and forth between an image capturing start position (the position illustrated in FIG. 4A) and an image capturing end position (the position illustrated in FIG. 4B).

Specifically, during a period in which the workpiece W moves from the image capturing start position to the image capturing end position, the X-ray generator 10 and the X-ray detector 11 capture an image of the workpiece W while moving in the conveyance direction B from the image capturing start position to the image capturing end position at a speed equal to the conveyance speed of the workpiece W, so that the X-ray generator 10 and the X-ray detector 11 performs a following movement of following the workpiece W. That is, an X-ray irradiation range by the X-ray generator 10 follows the workpiece W and moves in the conveyance direction B when the image of the workpiece W is captured. Further, the X-ray detector 11 moves in a direction parallel to the conveyance direction B in conjunction with the movement of the X-ray irradiation range.

The X-ray generator 10 and the X-ray detector 11 performs a return movement of returning to the image capturing start position after the previous workpiece W has moved to the image capturing end position and before a workpiece W to be conveyed next reaches the image capturing start position. In the present embodiment, when the X-ray generator 10 and the X-ray detector 11 return to the image capturing start position, it is desirable that the next workpiece W is located at the image capturing start position. That is, it is desirable that a timing at which the X-ray generator 10 and the X-ray detector 11 return to the image capturing start position coincides with a timing at which the next workpiece W reaches the image capturing start position.

It is desirable that a movement speed at which the X-ray generator 10 and the X-ray detector 11 return to the image capturing start position is faster than the conveyance speed of the workpiece W. That is, it is desirable that the X-ray generator 10 and the X-ray detector 11 move at a faster speed in the opposite direction of the conveyance direction B than at the speed at which the X-ray generator 10 and the X-ray detector 11 move in the conveyance direction B. As a result, it is possible to reduce an interval between workpieces W that are sequentially conveyed, and it is possible to increase the number of inspections of the workpieces W per unit time.

Transition of Movement of Image Capturing Unit

Next, transitions in movement of the image capturing unit 30 will be described with reference to FIGS. 3 to 4E.

Figure 3:
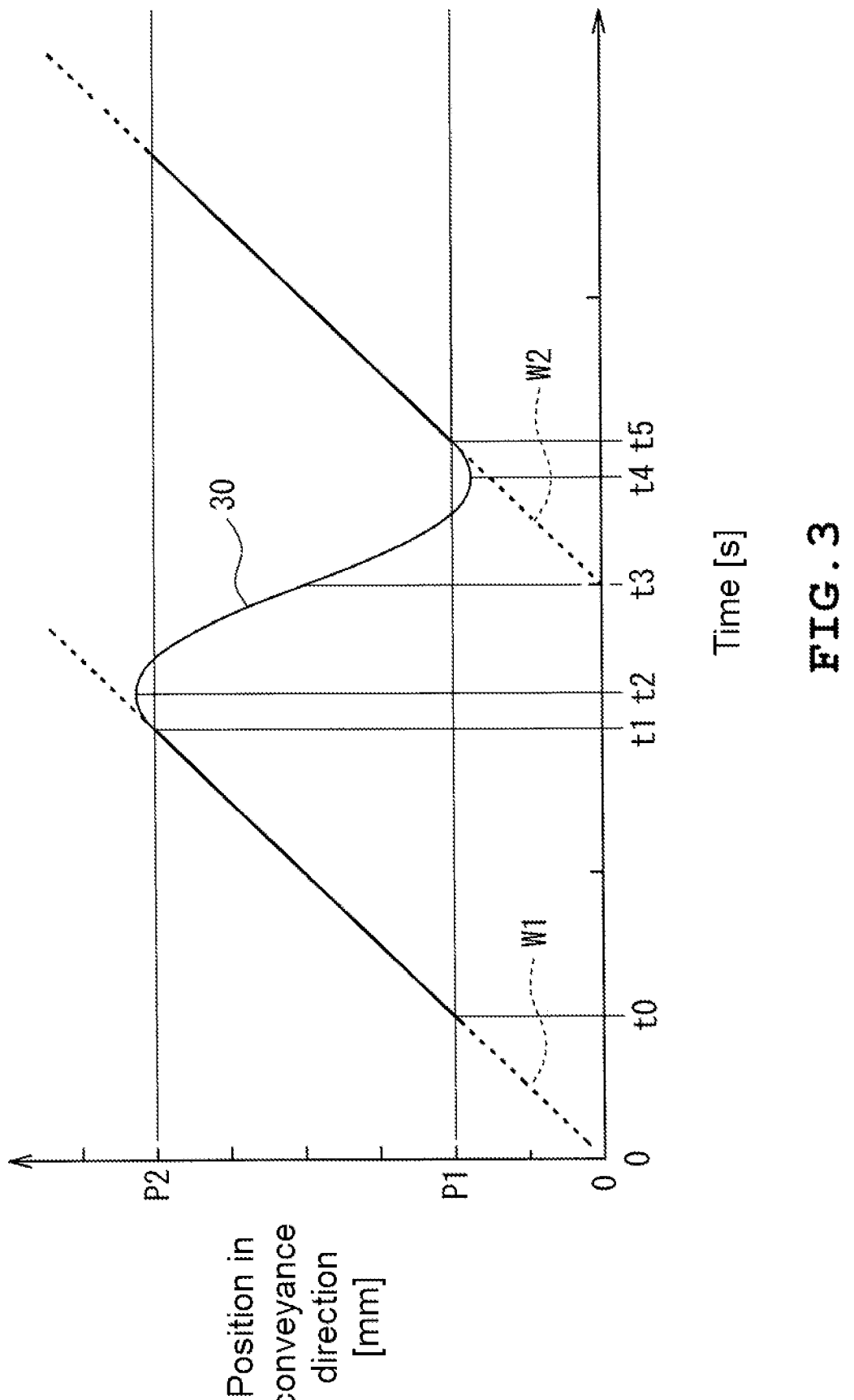
FIG. 3 is a graph showing transitions in movement of an image capturing unit of the X-ray inspection apparatus according to the embodiment of the present invention.

In FIG. 3, broken lines indicate transitions in the movement of the workpiece W, and solid lines indicate transitions in the movement of the image capturing unit 30. The transition of the movement of the image capturing unit 30 will be described with reference to FIG. 3, by using, as an example, a workpiece W1 that is conveyed first and a workpiece W2 that is conveyed next among workpieces W that are conveyed sequentially. In FIG. 3, P1 indicates the image capturing start position, and P2 indicates the image capturing end position.

FIGS. 4A to 4E are diagrams illustrating the positional relationship between the image capturing unit 30 and the workpiece W at each time from time t0 to time t4 illustrated in FIG. 3. FIG. 4A corresponds to the time t0, FIG. 4B corresponds to the time t1, FIG. 4C corresponds to the time t2, FIG. 4D corresponds to the time t3, and FIG. 4E corresponds to the time t4.

As illustrated in FIG. 3, when the workpiece W1 reaches the image capturing start position P1 at the time t0, the image capturing unit 30 starts image capturing of the workpiece W1 while moving toward the image capturing end position P2 at the speed equal to the conveyance speed of the workpiece W1 to follow the workpiece W1. That is, as illustrated in FIG. 4A, at a timing at which the center of the workpiece W1 in the conveyance direction coincides with an image capturing axis A perpendicular to an image capturing surface of the X-ray detector 11, the X-ray generator 10 and the X-ray detector 11 start following the workpiece W1 while starting image capturing of the workpiece W1.

Thereafter, image capturing of the workpiece W1 is performed while the workpiece W1 and the image capturing unit 30 move at the equal speed, until the image capturing of the workpiece W1 is ended, that is, until the workpiece W1 reaches the image capturing end position P2.

Then, when the workpiece W1 and the image capturing unit 30 reach the image capturing end position P2 (the position illustrated in FIG. 4B) at the time t1, the image capturing of the workpiece W1 is ended, and an operation for the image capturing unit 30 to return to the image capturing start position P1 is started. Specifically, reverse driving of the drive unit 14 is started by the control unit 25.

At this time, after the image capturing unit 30 slightly passes through the image capturing end position P2 in the conveyance direction B, the movement direction is reversed at this position (the position illustrated in FIG. 4C) and returning to the image capturing start position P1 is started.

At the time t2, when the image capturing unit 30 starts to return to the image capturing start position P1, a positive acceleration is applied to the image capturing unit 30. That is, the image capturing unit 30 accelerates and moves toward the image capturing start position P1 from the position illustrated in FIG. 4C.

Then, at the time t3, the acceleration applied to the image capturing unit 30 is switched from positiveness to negativeness. That is, the drive unit 14 is controlled by the control unit 25 so that a negative acceleration is applied to the image capturing unit 30 that has moved at the positive acceleration, after the time t3. Thus, decelerating is started.

The time t3 is, for example, a timing at which the image capturing unit 30 reaches half the moving distance of the image capturing unit 30, that is, an intermediate position (the position illustrated in FIG. 4D) between the image capturing start position P1 and the image capturing end position P2. The time t3 can also be defined as t3=(t2+t4)/2. A timing at which the acceleration applied to the image capturing unit 30 is switched between positiveness and negativeness is not limited to the timing described above, and may be changed as appropriate depending on the specifications of the image capturing unit 30 and the drive unit 14.

Then, the image capturing unit 30 in decelerating slightly passes through the image capturing start position P1 in the opposite direction of the conveyance direction B, and then decelerating is stopped at the time t4. The movement direction is reversed at this timing, and movement toward the image capturing end position P2 is started. At this time, as illustrated in FIG. 4E, the workpiece W2 has not yet reached the image capturing start position P1.

Thereafter, when the workpiece W2 reaches the image capturing start position P1 at the time t5, the image capturing unit 30 starts image capturing of the workpiece W2 while moving toward the image capturing end position P2 at the speed equal to the conveyance speed of the workpiece W2 to follow the workpiece W2. Thereafter, the flow is the same as that for the workpiece W1.

As described above, the drive unit 14 is controlled by the control unit 25 so that the X-ray generator 10 and the X-ray detector 11 periodically repeat back-and-forth movement.

Adjustment of Movement Speed of Image Capturing Unit

Next, adjustment of the movement speed of the image capturing unit will be described with reference to FIGS. 5A to 8.

Figure 5A:
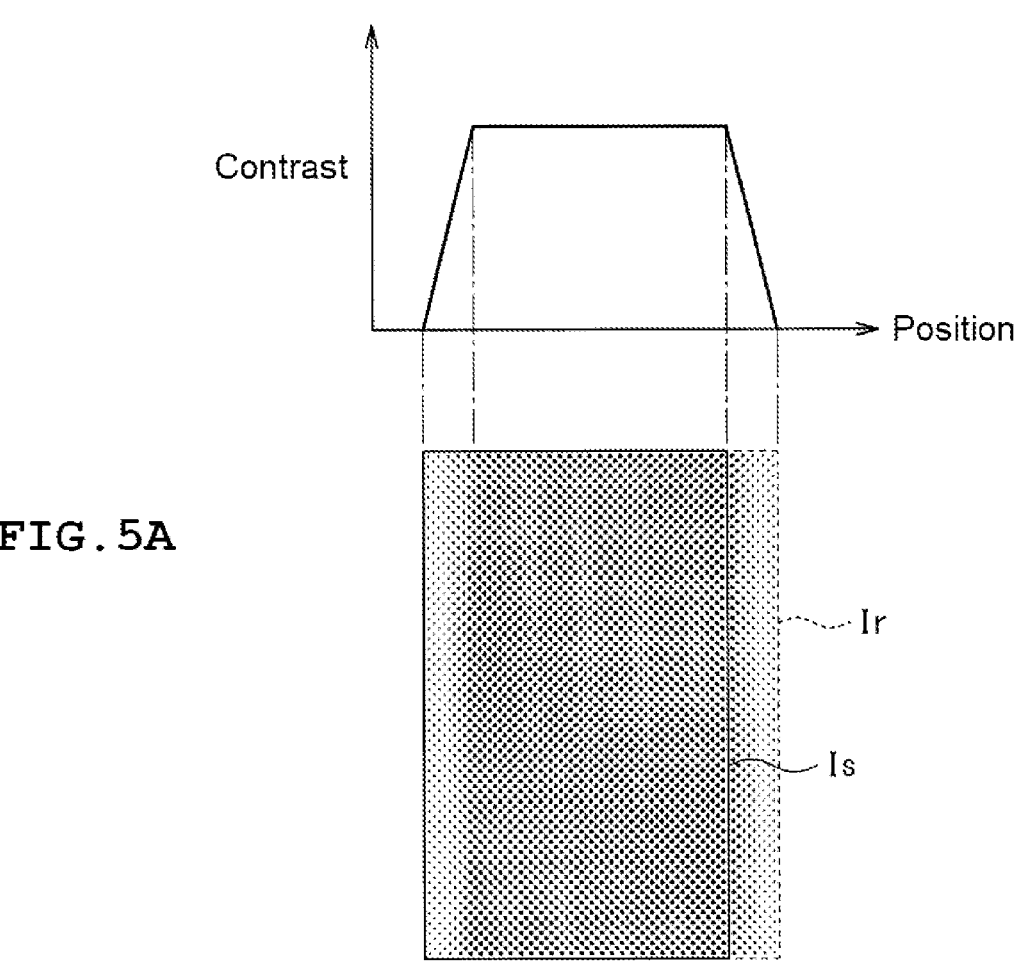
Figure 5B:
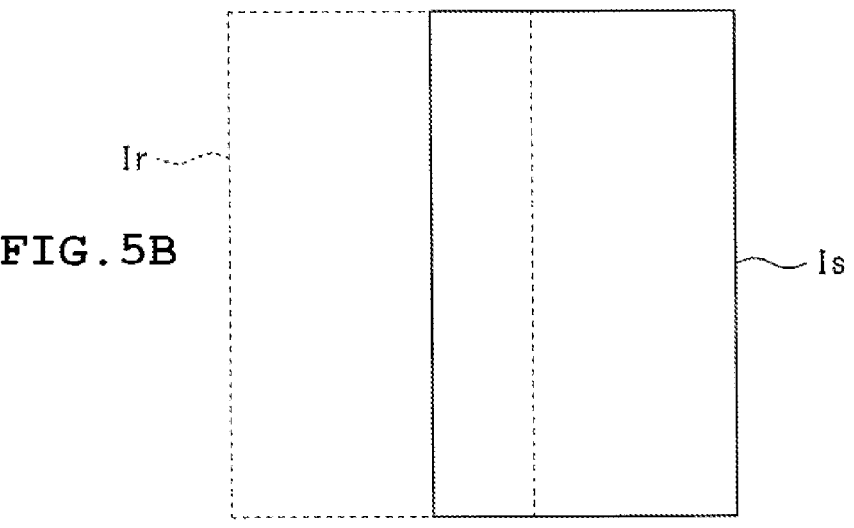

When an image of the workpiece W is captured, if the movement of the workpiece W and the movement of the image capturing unit 30 are not synchronized with each other, for example, a workpiece image Ir in the captured X-ray image becomes blurred (state illustrated in FIG. 5A) with respect to a workpiece image Is in the reference image, and the position of the workpiece image Ir in the captured X-ray image is shifted from the workpiece image Is in the reference image (the state illustrated in FIG. 5B). Thus, the quality of the captured X-ray image deteriorates.

Here, as a pattern in which the movement of the workpiece W and the movement of the image capturing unit 30 are not synchronized with each other, there are a first pattern and a second pattern as follows, for example.

Figure 6:
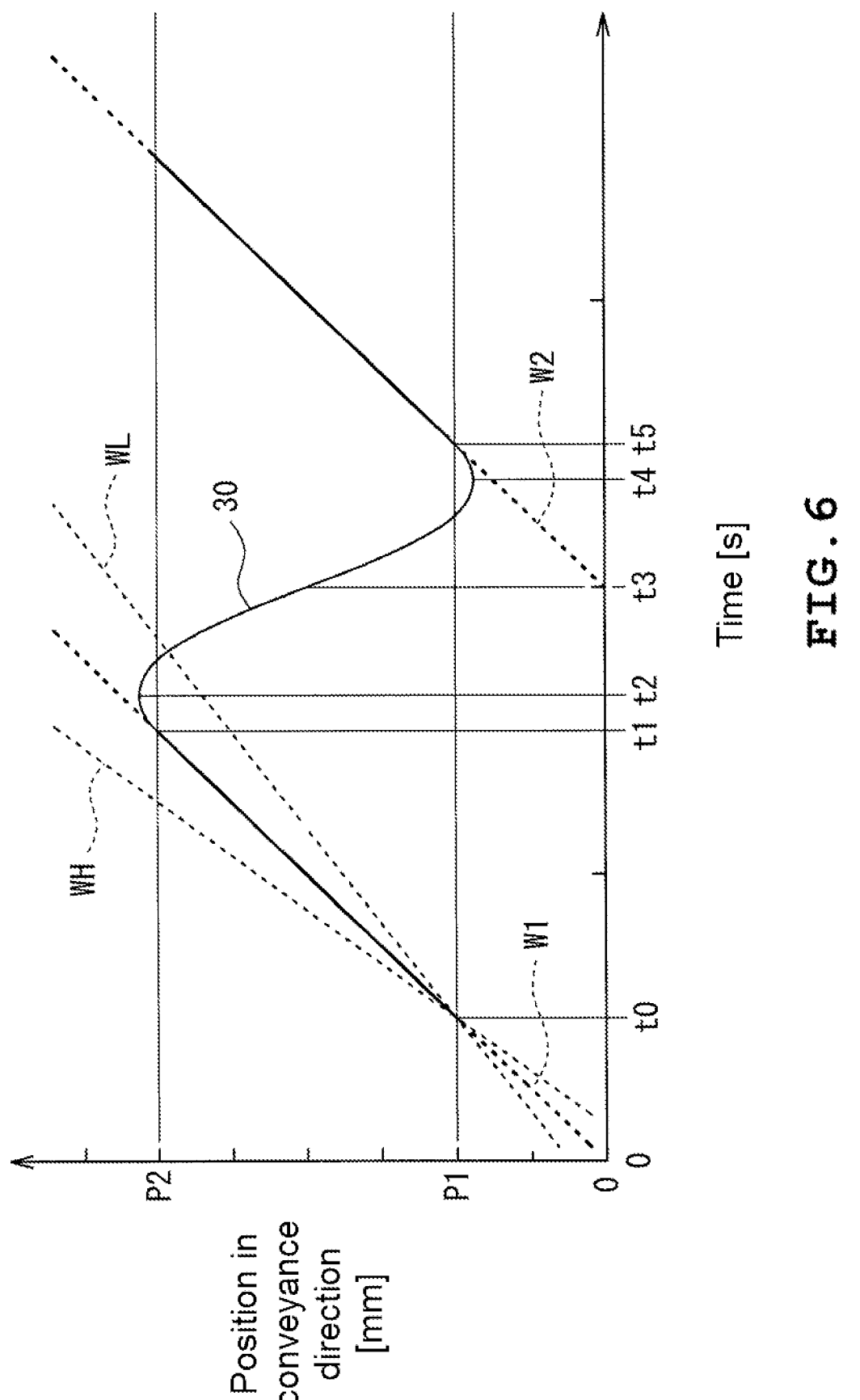
FIG. 6 is a time chart in a case (first pattern) where a following speed of the image capturing unit in the X-ray inspection apparatus according to the embodiment of the present invention does not coincide with a conveyance speed of the workpiece.

As illustrated in FIG. 6, the first pattern is a pattern in which the conveyance speed of the workpiece W such as a workpiece WH or a workpiece WL deviates from the conveyance speed of the workpiece W1 having a speed equal to the movement speed (referred to as a "following speed" below) of the image capturing unit 30 during a following movement. The workpiece WH is conveyed at a conveyance speed faster than the conveyance speed of the workpiece W1. The workpiece WL is conveyed at a conveyance speed slower than the conveyance speed of the workpiece W1.

In the case of the first pattern, the workpiece image in the captured X-ray image becomes blurred. For example, FIG. 5A illustrates a comparison of the workpiece image Ir when an image of the workpiece WH is captured, to the workpiece image Is in the reference image.

When an image of the workpiece W is captured, the image capturing is performed at a frame rate of, for example, 20 frames/second. Therefore, when the workpiece WH moves at the speed faster than the image capturing unit 30, as illustrated in FIG. 5A, the workpiece image of the workpiece WH becomes a blurred image in which the workpiece image is extended in the conveyance direction (in the rightward direction in FIGS. 5A and 5B) as with the workpiece image Ir, and the contrast gradually decreases toward both ends in a direction parallel to the conveyance direction of the workpiece image. In a case where an image of the workpiece WL is captured, the direction in which the workpiece image is extended is the direction opposite to the conveyance direction (in the leftward direction in FIGS. 5A and 5B).

Thus, the determination unit 27 in the present embodiment performs determination to be the first pattern in which image information of an X-ray image obtained by the image capturing does not coincide with the reference image information, in a case where the contrast of the workpiece image in the X-ray image obtained by image capturing during the following movement is different from the contrast of the workpiece image in the reference image.

In the present embodiment, in order to eliminate the first pattern, the control unit 25 adjusts the following speed of the image capturing unit 30 during the following movement.

Specifically, in a case where the following speed of the image capturing unit 30 is slower than the conveyance speed of the workpiece W, the control unit 25 controls the drive unit 14 to increase the following speed of the image capturing unit 30. On the other hand, in a case where the following speed of the image capturing unit 30 is faster than the conveyance speed of the workpiece W, the control unit 25 controls the drive unit 14 to slow down the following speed of the image capturing unit 30.

In a case where it becomes necessary to adjust the movement speed of the image capturing unit 30 during the return movement by adjusting the following speed of the image capturing unit 30 as described above, it is preferable that the control unit 25 also adjusts the movement speed of the image capturing unit 30 together during the return movement.

Figure 7:
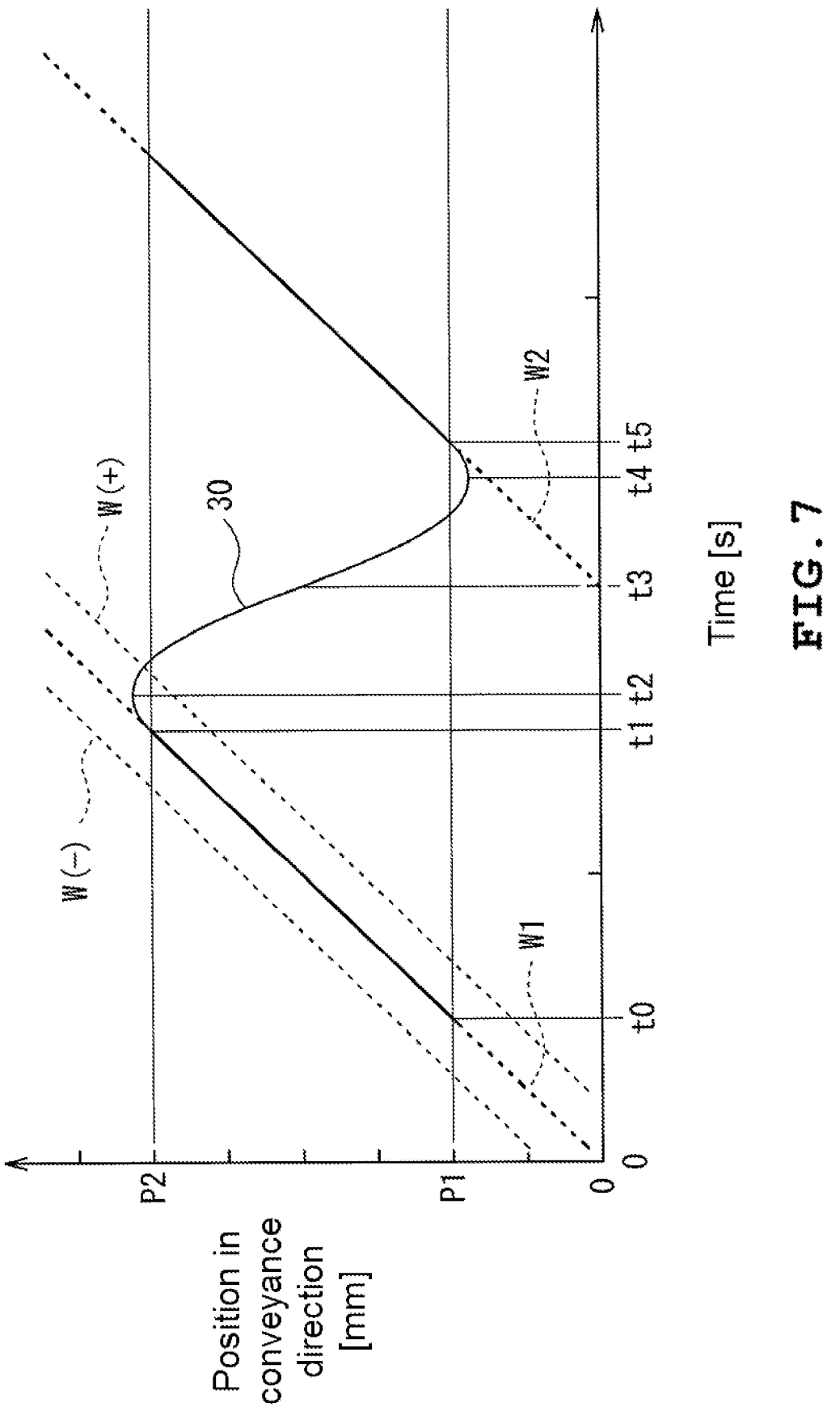
FIG. 7 is a time chart in a case (second pattern) where a timing at which the image capturing unit in the X-ray inspection apparatus according to the embodiment of the present invention starts image capturing does not coincide with a timing at which the workpiece reaches an image capturing start position.

As illustrated in FIG. 7, the second pattern is a pattern in which the timing at which the image capturing unit 30 is located at the image capturing start position P1 is different from the timing at which the workpiece W reaches the image capturing start position P1.

The workpiece W(−) is a transition of the workpiece in a case where the image capturing unit 30 reaches the image capturing start position P1 at a timing faster than the timing at which the image capturing unit 30 is located at the image capturing start position P1. For example, in a case where the interval between workpieces that are sequentially conveyed is narrow, as with the workpiece W(−), the workpiece reaches the image capturing start position P1 before the image capturing unit 30 is located at the image capturing start position P1.

The workpiece W(+) is a transition of the workpiece in a case where the image capturing unit 30 reaches the image capturing start position P1 at a timing slower than the timing at which the image capturing unit 30 is located at the image capturing start position P1. For example, in a case where the interval between workpieces that are sequentially conveyed is wide, as with the workpiece W(+), the workpiece reaches the image capturing start position P1 with a delay from the timing at which the image capturing unit 30 is located at the image capturing start position P1.

In the case of the second pattern, the position of the workpiece image Ir in the captured X-ray image is shifted from the position of the workpiece image Is in the reference image. For example, FIG. 5B illustrates a comparison of the workpiece image Ir when an image of the workpiece W(+) is captured, to the workpiece image Is in the reference image.

When an image of the workpiece W(+) is captured, as illustrated in FIG. 5B, the workpiece image Ir of the workpiece W(+) is an image having a position that is shifted from the workpiece image Is in the reference image in the opposite direction of the conveyance direction (leftward direction in FIGS. 5A and 5B). In a case where the image of the workpiece W(−) is captured, the workpiece image Ir of the workpiece W(−) is an image having a position that is shifted from the workpiece image Is in the reference image in the conveyance direction (rightward direction in FIGS. 5A and 5B).

Thus, the determination unit 27 in the present embodiment performs determination to be the second pattern in which image information of an X-ray image obtained by the image capturing does not coincide with the reference image information, in a case where the position of the workpiece image in the X-ray image obtained by image capturing during the following movement is different from the position of the workpiece image in the reference image.

In the present embodiment, in order to eliminate the second pattern, the control unit 25 adjusts the movement speed of the image capturing unit 30 during the return movement, that is, acceleration and deceleration (also collectively referred to as "acceleration/deceleration" below).

Specifically, the control unit 25 controls the drive unit 14 to increase the acceleration/deceleration of the image capturing unit 30 during the return movement, in a case where the workpiece W reaches the image capturing start position P1 at a timing faster than the timing at which the image capturing unit 30 is located at the image capturing start position P1 (in the case of the workpiece W(−) in FIG. 7). On the other hand, the control unit 25 controls the drive unit 14 to reduce the acceleration/deceleration of the image capturing unit 30 during the return movement, in a case where the workpiece W reaches the image capturing start position P1 at a timing slower than the timing at which the image capturing unit 30 is located at the image capturing start position P1.

In a case where the second pattern has occurred, the control unit 25 may adjust the timing of acceleration and deceleration instead of or in addition to adjusting the acceleration/deceleration of the image capturing unit 30 during the return movement.

Figure 8:
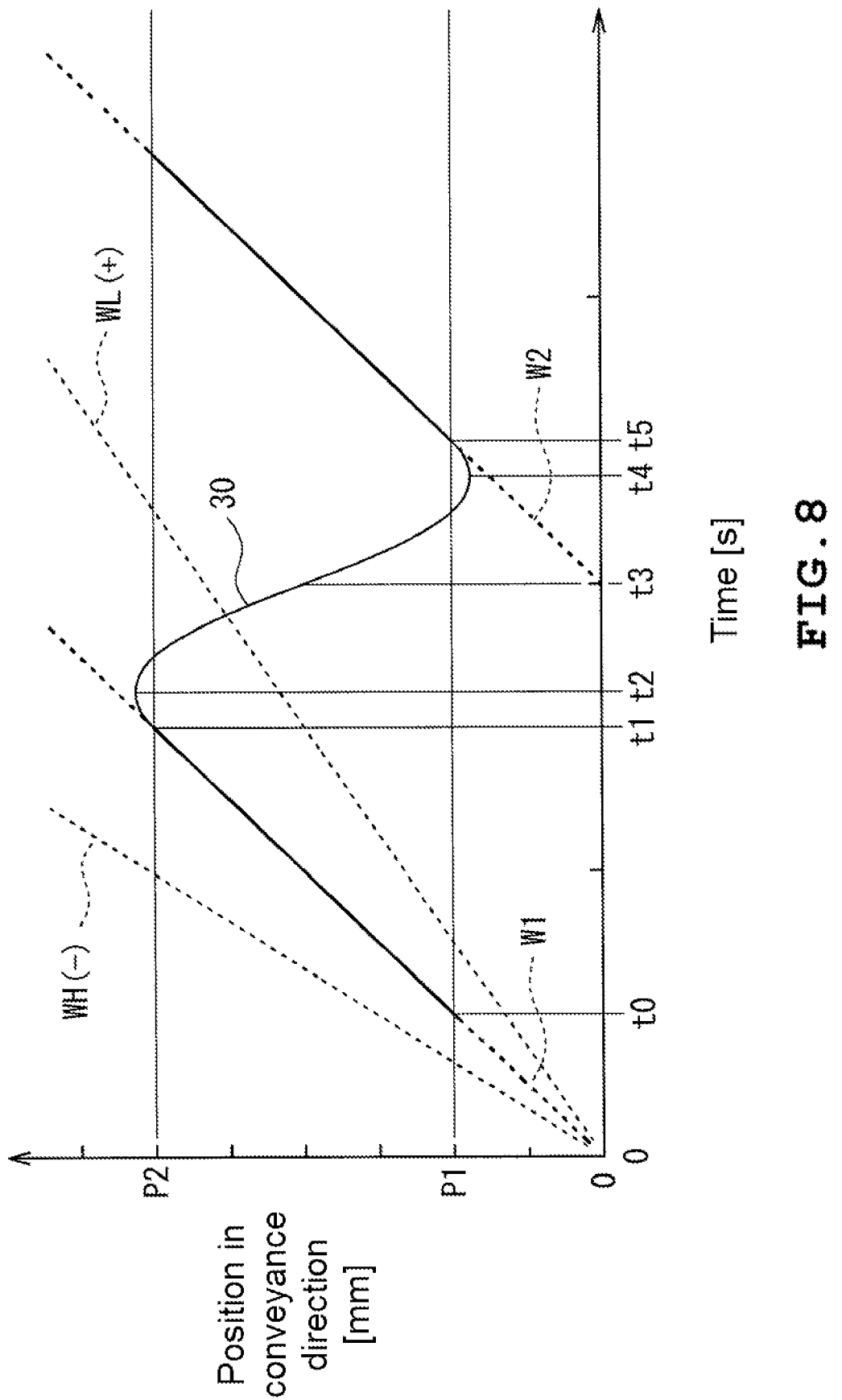
FIG. 8 is a time chart in a case where the first pattern in FIG. 6 and the second pattern in FIG. 7 occur simultaneously.

Here, the first pattern and the second pattern described above may occur simultaneously. In this case, the transition of the workpiece W is, for example, a transition such as the workpiece WH(−) or the workpiece WL(+) as illustrated in FIG. 8.

The workpiece WH(−) is a transition of the workpiece in a case where the workpiece moves at a speed faster than the image capturing unit 30 and reaches the image capturing start position P1 at a timing faster than the timing at which the image capturing unit 30 is located at the image capturing start position P1.

The workpiece WL(+) is a transition of the workpiece in a case where the workpiece moves at a speed slower than the image capturing unit 30 and reaches the image capturing start position P1 at a timing slower than the timing at which the image capturing unit 30 is located at the image capturing start position P1.

The workpiece WH(−) and the workpiece WL(+) are examples of combinations in a case where the first pattern and the second pattern have occurred simultaneously. For example, combinations such as the transitions of the workpiece WL(−) and the workpiece WH(+) may be obtained.

In a case where the first pattern and the second pattern have occurred simultaneously, it is preferable that the control unit 25 adjusts the following speed of the image capturing unit 30 during the following movement and adjusts the acceleration/deceleration of the image capturing unit 30 during the return movement.

Each of the patterns illustrated in FIGS. 6 to 8 described above is an example of the transition of the workpiece W when the following shift in which the movement of the workpiece W and the movement of the image capturing unit 30 are not synchronized with each other occurs, and the present embodiment is not limited to these patterns.

Following Shift Judgement Process

Next, the flow of the following shift judgement process executed by the control circuit 20 will be described with reference to the flowchart of FIG. 9.

Figure 9:
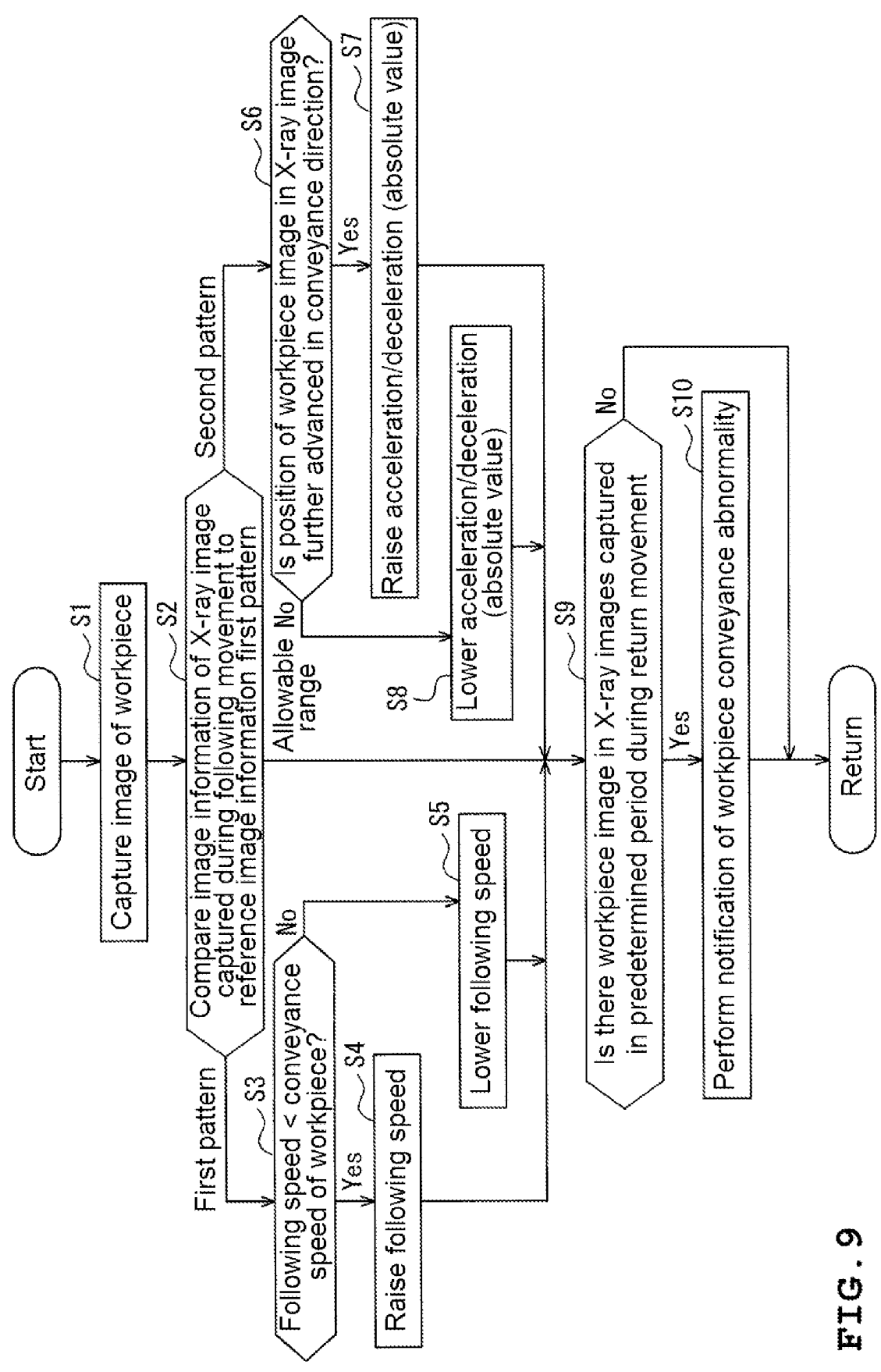
FIG. 9 is a flowchart illustrating a flow of a following shift judgement process executed in the X-ray inspection apparatus according to the embodiment of the present invention.

As illustrated in FIG. 9, the control circuit 20 captures an image of the workpiece W during the following movement of the image capturing unit 30 (Step S1).

Then, the control circuit 20 compares the image information of the X-ray image captured in Step S1 and the reference image information stored in the reference image information storage unit 26 (Step S2).

In a case where it is judged that a difference between the image information of the X-ray image captured in Step S1 and the reference image information stored in the reference image information storage unit 26 falls within an allowable range (including coinciding) as a result of the comparison in Step S2, the control circuit 20 causes the process to proceed to Step S9.

In a case where the control circuit 20 performs judgement to be the first pattern in which the following speed of the image capturing unit 30 does not coincide with the conveyance speed of the workpiece W during the following movement as a result of the comparison in Step S2, the control circuit 20 causes the process to proceed to Step S3.

In a case where the control circuit 20 performs judgement to be the second pattern in which the timing at which the image capturing unit 30 is located at the image capturing start position P1 is different from the timing at which the workpiece W reaches the image capturing start position P1 as a result of the comparison in Step S2, the control circuit 20 causes the process to proceed to Step S6.

In Step S3, the control circuit 20 judges whether or not the following speed of the image capturing unit 30 is smaller than the conveyance speed of the workpiece W. Specifically, the control circuit 20 can judge whether or not the following speed of the image capturing unit 30 is smaller than the conveyance speed of the workpiece W by determining whether or not, with respect to the workpiece image in the reference image, the workpiece image in the X-ray image captured in Step S1 is an image that has been extended in either the conveyance direction or the opposite direction.

In a case where it is judged in Step S3 that the following speed of the image capturing unit 30 is smaller than the conveyance speed of the workpiece W, the control circuit 20 increases the following speed of the image capturing unit 30, that is, raises the following speed (Step S4), and causes the process to proceed to Step S9.

In a case where it is judged in Step S3 that the following speed of the image capturing unit 30 is not smaller than the conveyance speed of the workpiece W, that is, the following speed of the image capturing unit 30 is greater than the conveyance speed of the workpiece W, the control circuit 20 lowers the following speed of the image capturing unit 30, that is, decreases the following speed (Step S5), and causes the process to proceed to Step S9.

Here, in a case where the above-described following speed coincides with the conveyance speed, it is determined to be within the allowable range in Step S2. Thus, in the case of "No" in Step S3, a case where the following speed coincides with the conveyance speed is not included.

In Step S6, the control circuit 20 judges whether or not the position of the workpiece image in the X-ray image captured in Step S1 is further advanced in the conveyance direction of the workpiece W than the workpiece image in the reference image.

In a case where it is judged in Step S6 that the position of the workpiece image in the X-ray image captured in Step S1 is further advanced in the conveyance direction of the workpiece W than the workpiece image in the reference image, the control circuit 20 raises the acceleration/deceleration of the image capturing unit 30 during the return movement, that is, increases the absolute value of the acceleration/deceleration (Step S7), and causes the process to proceed to Step S9. Thus, each of the acceleration and the deceleration of the image capturing unit 30 during the return movement is increased.

In a case where it is judged in Step S6 that the position of the workpiece image in the X-ray image captured in Step S1 is not further advanced in the conveyance direction of the workpiece W than the workpiece image in the reference image, that is, it is delayed in the opposite direction of the conveyance direction, the control circuit lowers the acceleration/deceleration of the image capturing unit 30 during the return movement, that is, decreases the absolute value of the acceleration/deceleration (Step S8), and causes the process to proceed to Step S9. Thus, each of the acceleration and the deceleration of the image capturing unit 30 during the return movement is decreased.

Here, in a case where the position of the workpiece image in the X-ray image captured in Step S1 coincides with the position of the workpiece image in the reference image, it is determined to be within the allowable range in Step S2. Thus, in the case of "No" in Step S6, a case where the position of the workpiece image in the X-ray image captured in Step S1 coincides with the position of the workpiece image in the reference image is not included.

In Step S9, the control circuit 20 judges whether or not there is a workpiece image among X-ray images captured within a predetermined period during the return movement. That is, the control circuit 20 is configured to perform image capturing during a predetermined period during the return movement, in addition to the image capturing in Step S1, and the control circuit 20 judges whether or not the workpiece image is included in the X-ray images captured within the predetermined period.

The predetermined period is a period in which the workpiece W will not appear in the X-ray image in a case where no following shift occurs. For example, in the present embodiment, the predetermined period corresponds to a period from the time t2 to the time t4 in FIG. 3.

In a case where it is judged in Step S9 that there is no workpiece image in the X-ray images captured within the predetermined period during the return movement, the control circuit 20 ends the current following shift judgement process.

In a case where the control circuit 20 judges in Step S9 that there is the workpiece image among the X-ray images captured within the predetermined period during the return movement, the control circuit 20 determines that the conveyance interval of the workpieces is narrow to an extent that the following shift is not eliminated by increasing or decreasing the following speed or the acceleration/deceleration described above. Then, the control circuit 20 transmits, to the outside via the display unit 12 or the like, for example, a notification of a workpiece conveyance abnormality indicating that the conveyance of the workpiece is abnormal (Step S10), and ends the current following shift judgement process.

Actions and Effects

As described above, in the X-ray inspection apparatus according to the present embodiment, the X-ray generator 10 and the X-ray detector 11 are configured to be movable back and forth in the direction parallel to the conveyance direction B of the inspection object W, and capture an image of the inspection object W while moving in the conveyance direction B from the image capturing start position P1 to the image capturing end position P2 at the speed equal to the conveyance speed of the inspection object W. Thus, it is possible to lengthen an exposure time without reducing the conveyance speed of the inspection object W as compared to a configuration in which the X-ray generator 10 and X-ray detector 11 are fixed and perform image capturing. Therefore, in the X-ray inspection apparatus according to the present embodiment, it is possible to obtain a clear transmission image with less noise without reducing the conveyance speed of the inspection object W.

Here, when the conveyance of the inspection object W is stopped each time the exposure is performed in order to lengthen the exposure time, for example, in a case where the inspection object W is a container filled with a liquid or the like, the liquid level fluctuates each time the stopping, and thus it is not possible to start the conveyance until fluctuation of the liquid level is eliminated. Therefore, it is not possible to increase the number of inspections of the inspection object W per unit time.

In the X-ray inspection apparatus according to the present embodiment, it is not necessary to stop the conveyance of the inspection object W. Thus, it is possible to increase the number of inspections of the inspection object W per unit time without an occurrence of the fluctuation of the liquid level as described above.

In addition, in the X-ray inspection apparatus according to the present embodiment, a clear transmission image with less noise is obtained by moving the X-ray generator 10 and the X-ray detector 11 back and forth to ensure a long exposure time as described above. Thus, there is no need to increase a current or voltage of the X-ray source in the X-ray generator 10 to perform irradiation with high-output X-rays, and it is possible to reduce the output of the X-ray source. Furthermore, by reducing the output of the X-ray source, it is possible to reduce the size of the X-ray generator 10.

Furthermore, in the X-ray inspection apparatus according to the present embodiment, the X-ray generator 10 and the X-ray detector 11 move to the image capturing end position P2, and then return to the image capturing start position P1 before the inspection object W to be conveyed next reaches the image capturing start position P1. Thus, it is possible to bring the X-ray generator 10 and X-ray detector 11 back to the image capturing start position P1 provided for image capturing of the next inspection object W, by using a gap time between inspection objects W that are sequentially conveyed.

In addition, in the X-ray inspection apparatus according to the present embodiment, the movement speed at which the X-ray generator 10 and the X-ray detector 11 return to the image capturing start position P1 is faster than the conveyance speed of the inspection object W. Thus, it is possible to reduce an interval between the inspection objects W that are sequentially conveyed, and it is possible to increase the number of inspections per unit time.

Further, in the X-ray inspection apparatus according to the present embodiment, there is provided the control unit 25 that adjusts the movement speed of the image capturing unit 30 in a case where the determination unit 27 determines that the image information of the X-ray image obtained by the image capturing during the following movement does not coincide with the reference image information. Thus, it is possible to improve the quality of the X-ray image by adjusting the movement speed of the image capturing unit 30 even in a case where, for example, the workpiece image in the X-ray image becomes unclear or the position of the workpiece image in the X-ray image is shifted from the position of the workpiece image in the reference image due to the occurrence of the shift between the movement of the workpiece W and the following movement of the image capturing unit 30, whereby the quality of the X-ray image deteriorates.

Therefore, in the X-ray inspection apparatus according to the present embodiment, it is possible to obtain a clear transmission image with less noise without reducing the conveyance speed of the inspection object.

In addition, the X-ray inspection apparatus according to the present embodiment performs the determination to be the first pattern in which the image information of the X-ray image obtained by image capturing during the following movement does not coincide with the reference image information, in a case where the contrast of the workpiece image in the X-ray image obtained by image capturing during the following movement is different from the contrast of the workpiece image in the reference image, and adjusts the movement speed of the following movement of the image capturing unit 30 in this case. Thus, it is possible to cause the movement speed of the image capturing unit 30 during the following movement to coincide with the conveyance speed of the workpiece W. As a result, it is possible to cause the contrast of the workpiece image in the X-ray image obtained by image capturing during the following movement to coincide with the contrast of workpiece image in the reference image, and it is possible to improve the quality of the X-ray image.

Furthermore, the X-ray inspection apparatus according to the present embodiment performs determination to be the second pattern in which the image information of the X-ray image obtained by image capturing during the following movement does not coincide with the reference image information, in a case where the position of the workpiece image in the X-ray image obtained by image capturing during the following movement is different from the position of the workpiece image in the reference image, and adjusts the movement speed of the return movement of the image capturing unit 30 in this case. Thus, it is possible to adjust the timing at which the image capturing unit 30 returns to the image capturing start position P1. Thus, it is possible to cause the timing at which the workpiece W reaches the image capturing start position P1 to coincide with the timing at which the X-ray generator 10 and the X-ray detector 11 start image capturing. As a result, it is possible to cause the position of the workpiece image in the X-ray image obtained by image capturing during the following movement to coincide with the position of the workpiece image in the reference image, and it is possible to improve the quality of the X-ray image.

Further, the X-ray inspection apparatus according to the present embodiment transmits a notification of the workpiece conveyance abnormality to the outside in a case where it is determined that there is a workpiece W in the X-ray images captured in the predetermined period during the return movement of the image capturing unit 30. Thus, it is possible to inform the user that there is a probability that the conveyance interval of workpieces is reduced or the conveyance speed is increased to an extent that it is not possible to respond to the conveyance interval of the workpiece W and the conveyance speed by adjusting the movement speed of the image capturing unit 30. In response to the above-described notification, the user can change settings of the conveyance device that conveys the workpiece W to the X-ray inspection apparatus 1 or the loading device that loads the workpiece W into the conveyance device, for example.

In addition, in the X-ray inspection apparatus according to the present embodiment, the X-ray generator 10 and the X-ray detector 11 are unitized to be integrally movable back and forth in the direction parallel to the conveyance direction B. Thus, it is possible to move the X-ray generator 10 and the X-ray detector 11 at the same speed without the shift.

In addition, in the X-ray inspection apparatus according to the present embodiment, the X-ray detector 11 is configured by the area sensor. Thus, it is possible to obtain a still image without stopping the conveyance of the inspection object W.

Modification Examples

In the present embodiment, the example in which the X-ray inspection apparatus according to the present invention is applied to a horizontal irradiation type X-ray inspection apparatus in which the X-ray generator 10 and the X-ray detector 11 are disposed to face each other in the horizontal direction perpendicular to the conveyance direction of the workpiece W with the conveyance path 3 interposed between the X-ray generator 10 and the X-ray detector 11 has been described. The X-ray inspection apparatus according to the present invention may be applied to an X-ray inspection apparatus of a type in which the X-ray generator 10 and the X-ray detector 11 are disposed to face each other in the vertical direction with the conveyance path 3 interposed between the X-ray generator 10 and the X-ray detector 11.

Furthermore, although the X-ray inspection apparatus according to the present embodiment is configured to include one set of the X-ray generator 10 and the X-ray detector 11, a configuration in which two or more sets of the X-ray generators 10 and the X-ray detectors 11 are provided may be adopted. In this case, a configuration in which the two or more sets of X-ray generators 10 and X-ray detectors 11 are unitized and integrally movable is preferable.

Further, in the X-ray inspection apparatus according to the present embodiment, the X-ray generator 10 and the X-ray detector 11 are configured to be unitized and be integrally movable back and forth. The present embodiment is not limited to this. The X-ray generator 10 and the X-ray detector 11 may be configured to be movable back and forth independently. In this case, the control unit 25 synchronizes the movement of the X-ray generator 10 and the movement of the X-ray detector 11 with each other.

In addition, in the X-ray inspection apparatus according to the present embodiment, in a case where the second pattern has occurred, the control unit 25 may transmit, to the outside via the display unit 12 or the like, for example, a notification that the image information of the X-ray image obtained by image capturing during the following movement does not coincide with the reference image information, instead of or in addition to adjusting the acceleration/deceleration of the image capturing unit 30 during the return movement.

In this case, since the notification that the image information of the X-ray image obtained by image capturing during the following movement does not coincide with the reference image information is transmitted to the outside, it is possible to inform the user that the quality of the X-ray image needs to be improved. In response to the above-described notification, the user can change settings of the conveyance device that conveys the workpiece W to the X-ray inspection apparatus 1 or the loading device that loads the workpiece W into the conveyance device, for example.

In addition, in the X-ray inspection apparatus according to the present embodiment, in a case where the first pattern or the second pattern has occurred, or in a case where the first pattern and the second pattern have occurred simultaneously, a plurality of X-ray images captured during the following movement may be corrected by image processing such that the position of the workpiece image in each X-ray image coincides with the position of the workpiece image in the reference image, and the corrected X-ray images may be superimposed to generate one X-ray image. Furthermore, when one X-ray image is generated as described above, for example, an X-ray image that largely deteriorates due to disturbances may not be superimposed.

Further, in the X-ray inspection apparatus according to the present embodiment, a light emitter/receiver may be provided in front of the image capturing start position P1 so as to sandwich the conveyance path 3. The light emitter/receiver detects the workpiece W being conveyed along the conveyance path 3 toward the image capturing start position P1.

In this case, it is possible to monitor the presence or absence of the workpiece W by the light emitter/receiver. For example, when the conveyance interval of the workpiece W is large to an extent that it is difficult to synchronize the movement of the workpiece W and the movement of the image capturing unit 30 with each other by adjusting the movement speed of the image capturing unit 30, it is possible to stop the operation of the image capturing unit 30.

In a case where the workpiece W is detected by the light emitter/receiver after the image capturing unit 30 is stopped, it is possible to restart the operation of the image capturing unit 30 upon detection of the workpiece W by the light emitter/receiver. In this case, it is sufficient that a start timing of the following movement of the image capturing unit 30 is set based on the timing of detection of the workpiece W by the light emitter/receiver.

X-ray Inspection System

Figure 10:
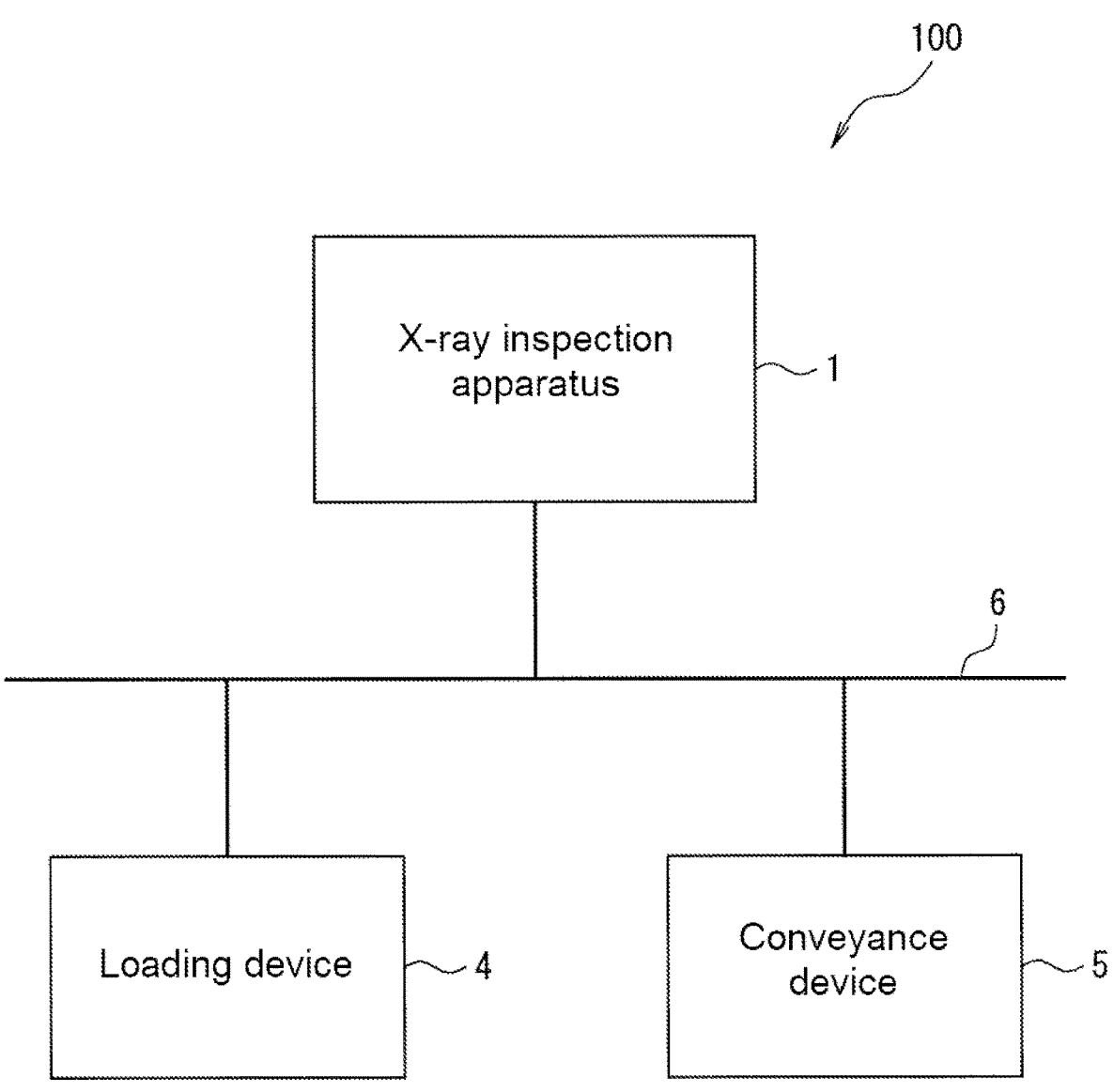
FIG. 10 is a schematic block diagram illustrating an X-ray inspection system including the X-ray inspection apparatus according to the embodiment of the present invention.

As illustrated in FIG. 10, the X-ray inspection apparatus 1 in the present embodiment may be used in an X-ray inspection system 100 that is connected to a loading device 4, a conveyance device 5 via a network 6.

The loading device 4 is a device that loads the workpiece W into the conveyance device 5. As the loading device 4, for example, a loading device of a timing screw type that uses a timing screw to align a plurality of workpieces W conveyed in an irregular or closely spaced manner from a conveyor in the previous process at a predetermined interval and feed the plurality of workpieces W at a predetermined speed can be used.

The conveyance device 5 is a device that includes the above-described conveyor 2 and conveys the workpiece W loaded from the loading device 4 to the X-ray inspection apparatus 1.

In the X-ray inspection system 100 in the present embodiment, in a case where the determination unit 27 in the X-ray inspection apparatus 1 determines that the second pattern has occurred, the control unit 25 in the X-ray inspection apparatus 1 outputs a signal to the loading device 4 to adjust a loading timing of the workpiece W into the conveyance device 5.

In this case, the control unit 25 in the X-ray inspection apparatus 1 outputs, to the loading device 4, the above-described signal for adjusting the loading timing of the workpiece W instead of, or in addition to adjusting the acceleration/deceleration of the image capturing unit 30 during the return movement.

As described above, the X-ray inspection system 100 according to the present embodiment performs determination to be the second pattern in which the image information of the X-ray image obtained by the image capturing does not coincide with the reference image information, in a case where the position of the workpiece image in the X-ray image obtained by the image capturing during the following movement is different from the position of the workpiece image in the reference image, and outputs the signal to the loading device 4 to adjust the loading timing of the workpiece W into the conveyance device 5. Thus, it is possible to adjust the loading timing of the workpiece W in the loading device 4.

Thus, it is possible to cause the timing at which the workpiece W reaches the image capturing start position P1 to coincide with the timing at which the X-ray generator 10 and the X-ray detector 11 start image capturing. As a result, it is possible to cause the position of the workpiece image in the X-ray image obtained by image capturing during the following movement to coincide with the position of the workpiece image in the reference image, and it is possible to improve the quality of the X-ray image.

X-ray Inspection Apparatuses with Different Following Methods

Figure 11:
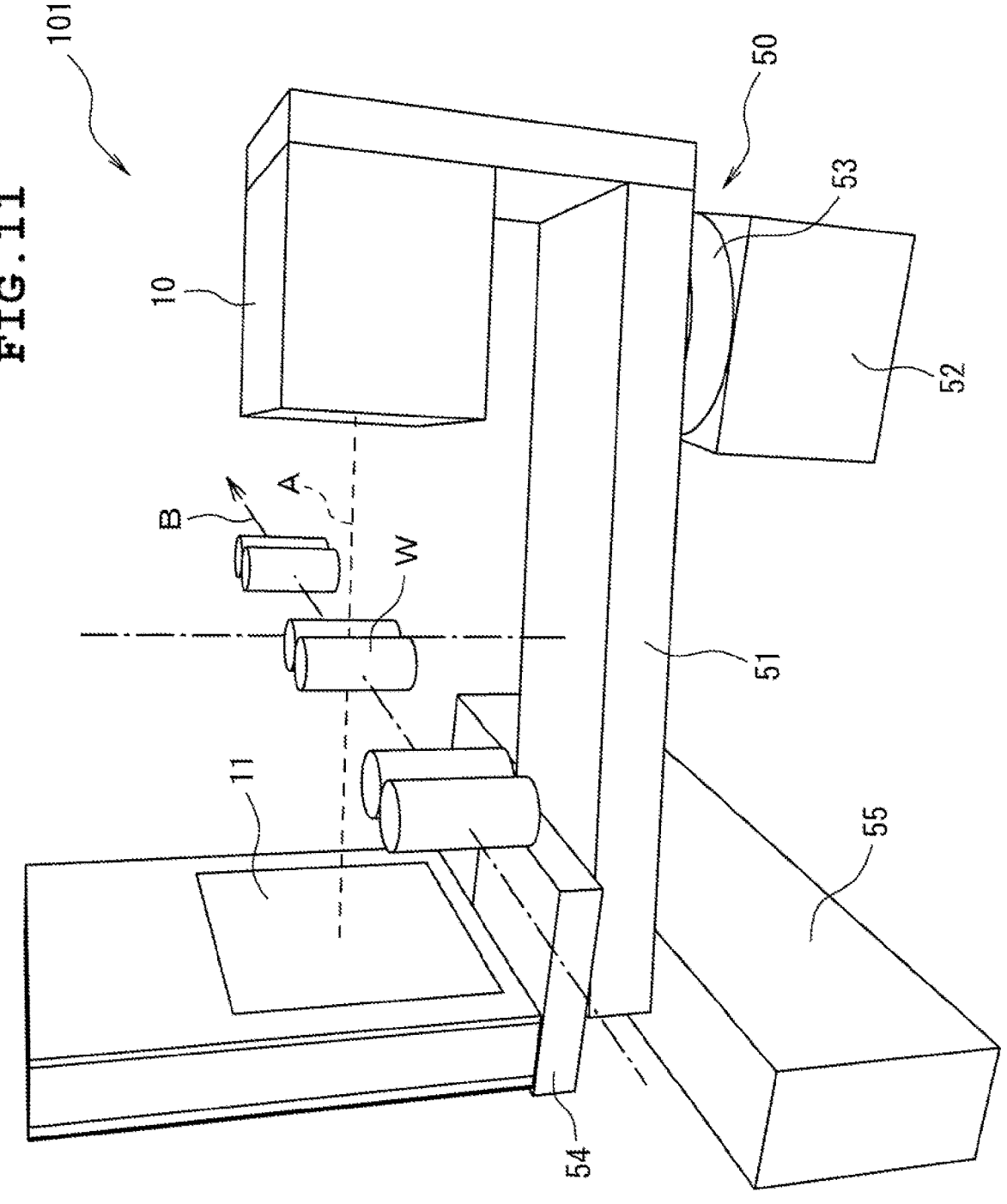
FIG. 11 is a perspective view illustrating a modification example of the X-ray inspection apparatus according to the embodiment of the present invention.

The X-ray inspection apparatus to which the present invention is applied may be an X-ray inspection apparatus 101 as illustrated in FIG. 11, which has a different following method from the X-ray inspection apparatus 1 in the present embodiment.

As illustrated in FIG. 11, the X-ray inspection apparatus 101 includes an X-ray generator 10 and an X-ray detector 11 that are unitized by being joined to each other via a joining bracket 51. As a result, the X-ray detector 11 is movable back and forth in the direction parallel to the conveyance direction B of the inspection object W in conjunction with the rotation of the X-ray generator 10.

In the X-ray inspection apparatus 101, the X-ray generator 10, the X-ray detector 11, and the joining bracket 51 constitute an image capturing unit 50.

The lower portion of the joining bracket 51 on the X-ray generator 10 side is joined to a rotating table 53. The rotating table 53 is rotatably supported by a rotary support section 52 in which a drive unit 14 is built-in, and is rotatably driven by the drive unit 14. Therefore, the joining bracket 51 is configured to be rotatable about the X-ray generator 10 side as a fulcrum.

A support base 54 is joined to the upper portion of the end portion of the joining bracket 51 on the X-ray detector 11 side. The X-ray detector 11 is supported on the support base 54.

An arc-shaped long hole (not illustrated) is formed at the end portion of the joining bracket 51 on the X-ray detector 11 side to penetrate the joining bracket 51 in the vertical direction. The long hole is long in the short-side direction of the joining bracket 51, that is, in the horizontal direction perpendicular to the central axis A of X-rays, and is formed to bulge out in an arch toward the X-ray generator 10 side.

A guide pin (not illustrated) is formed at the lower portion of the support base 54 to protrude downward. The guide pin is configured to penetrate the long hole of the joining bracket 51 described above and to move back and forth on a linear slider 55 that extends in the direction parallel to the conveyance direction B of the workpiece W.

As a result, even though the positional relationship between the end portion of the joining bracket 51 on the X-ray detector 11 side and the linear slider 55 changes due to the rotation of the joining bracket 51, the support base 54 can move linearly back and forth over the linear slider 55. Thus, even though the joining bracket 51 rotates, the X-ray detector 11 can move back and forth in the direction parallel to the conveyance direction while maintaining the distance from the conveyance path 3.

In the X-ray inspection apparatus 101, the X-ray generator 10 is configured to be rotatable within a predetermined angle range so that the X-ray irradiation range is movable back and forth in the direction parallel to the conveyance direction B when an image of the workpiece W is captured.

Hitherto, the embodiment of the present invention has been disclosed, but it is clear that changes can be made by those skilled in the art without departing from the scope of the present invention. All such modifications and equivalents are intended to be included in the claims as follows.

DESCRIPTION OF REFERENCE NUMERALS
AND SIGNS

1, 101 X-ray Inspection Apparatus
2 Conveyor
3 Conveyance Path
4 Loading Device
5 Conveyance Device
6 Network
10 X-ray Generator
11 X-ray Detector
12 Display Unit
13 Setting Operation Unit
14 Drive unit
20 Control Circuit
21 X-ray Image Storage Unit
22 Image Processing Unit
23 Judgement Unit
25 Control Unit
26 Reference Image Information Storage Unit
27 Determination Unit
30, 50 Image Capturing Unit
31 Moving Bracket
32, 55 Linear Slider
33, 34 Guide Rail
51 Joining Bracket
52 Rotary Support Portion
53 Rotating Table
54 Support Base
100 X-ray Inspection System
W, W1, W2 Workpiece (Inspection Object)
P1 Image Capturing Start Position
P2 Image Capturing End Position

What is claimed is:

1. An X-ray inspection apparatus comprising:
an X-ray generator that irradiates inspection objects that are sequentially conveyed with X-rays;
an X-ray detector that detects the X-rays that have been transmitted through the inspection object; and
a conveyance path through which the inspection object passes, wherein the X-ray generator and the X-ray detector are disposed to face each other with the conveyance path interposed between the X-ray generator and the X-ray detector, the X-ray generator and the X-ray detector are configured to move back and forth in a conveyance direction of the inspection object and an opposite direction, and the X-ray generator and the X-ray detector capture an image of the inspection object while performing a following movement of moving in the conveyance direction from an image capturing start position to an image capturing end position at a speed equal to a conveyance speed of the inspection object.

2. The X-ray inspection apparatus according to claim 1, wherein the X-ray generator and the X-ray detector are configured to perform the following movement to the image capturing end position, and then perform a return movement of returning to the image capturing start position before an inspection object to be conveyed next reaches the image capturing start position.

3. The X-ray inspection apparatus according to claim 2, wherein a movement speed of the return movement in which the X-ray generator and the X-ray detector return to the image capturing start position is faster than the conveyance speed.

4. The X-ray inspection apparatus according to claim 3, further comprising:

a reference image information storage unit that stores reference image information that is image information of a reference image obtained by capturing an image of the inspection object in advance;

a determination unit that determines whether or not image information of an X-ray image obtained by the image capturing coincides with the reference image information; and a control unit that adjusts an irradiation range of the X-rays and a movement speed of the X-ray detector in a case where the determination unit determines that the image information of the X-ray image obtained by the image capturing does not coincide with the reference image information.

5. The X-ray inspection apparatus according to claim 4, wherein the determination unit performs determination to be a first pattern in which the image information of the X-ray image obtained by the image capturing does not coincide with the reference image information, in a case where a contrast of the inspection object in the X-ray image obtained by the image capturing is different from a contrast of the inspection object in the reference image, and the control unit adjusts a movement speed of the following movement in a case of the first pattern.

6. The X-ray inspection apparatus according to claim 4, wherein the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit adjusts a movement speed of the return movement in a case of the second pattern.

7. The X-ray inspection apparatus according to claim 4, wherein the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit transmits, to an outside, a notification that the image information of the X-ray image obtained by the image capturing does not coincide with the reference image information, in a case of the second pattern.

8. The X-ray inspection apparatus according to claim 4, wherein the X-ray generator and the X-ray detector are configured to perform image capturing even during the return movement, the determination unit determines whether or not there is an inspection object in an X-ray image captured during the return movement, and the control unit transmits, to an outside, a notification that conveyance of an inspection object is abnormal, in a case where the determination unit determines that there is the inspection object in the X-ray image captured during the return movement.

9. The X-ray inspection apparatus according to claim 2, further comprising:

a reference image information storage unit that stores reference image information that is image information of a reference image obtained by capturing an image of the inspection object in advance;

a determination unit that determines whether or not image information of an X-ray image obtained by the image capturing coincides with the reference image information; and a control unit that adjusts an irradiation range of the X-rays and a movement speed of the X-ray detector in a case where the determination unit determines that the image information of the X-ray image obtained by the image capturing does not coincide with the reference image information.

10. The X-ray inspection apparatus according to claim 9, wherein the determination unit performs determination to be a first pattern in which the image information of the X-ray image obtained by the image capturing does not coincide with the reference image information, in a case where a contrast of the inspection object in the X-ray image obtained by the image capturing is different from a contrast of the inspection object in the reference image, and the control unit adjusts a movement speed of the following movement in a case of the first pattern.

11. The X-ray inspection apparatus according to claim 9, wherein the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit adjusts a movement speed of the return movement in a case of the second pattern.

12. The X-ray inspection apparatus according to claim 9, wherein the determination unit performs determination to be a second pattern in which the image information of the X-ray image obtained by the image capturing does not coincide with the reference image information, in a case where a position of the inspection object in the X-ray image obtained by the image capturing is different from a position of the inspection object in the reference image, and the control unit transmits, to an outside, a notification that the image information of the X-ray image obtained by the image capturing does not coincide with the reference image information, in a case of the second pattern.

13. The X-ray inspection apparatus according to claim 9, wherein the X-ray generator and the X-ray detector are configured to perform image capturing even during the return movement, the determination unit determines whether or not there is an inspection object in an X-ray image captured during the return movement, and the control unit transmits, to an outside, a notification that conveyance of an inspection object is abnormal, in a case where the determination unit determines that there is the inspection object in the X-ray image captured during the return movement.

14. The X-ray inspection apparatus according to claim 9, wherein the X-ray generator and the X-ray detector are unitized to be integrally movable back and forth in the conveyance direction and the opposite direction.

15. An X-ray inspection system comprising:

the X-ray inspection apparatus according to claim 9;

a conveyance device that conveys an inspection object to the X-ray inspection apparatus; and a loading device that loads the inspection object into the conveyance device, wherein the determination unit performs determination to be a second pattern in which image information of an X-ray image obtained by the image capturing does not coincide with the reference image information, in a case where a position of the inspection object in the X-ray image obtained by the image capturing is different from a position of the inspection object in the reference image, and the control unit outputs a signal to the loading device to adjust a loading timing of the inspection object into the conveyance device, in a case of the second pattern.

16. The X-ray inspection apparatus according to claim 2, wherein the X-ray generator and the X-ray detector are unitized to be integrally movable back and forth in the conveyance direction and the opposite direction.

17. The X-ray inspection apparatus according to claim 1, wherein the X-ray detector is configured by an area sensor.

* * * * *